United States Patent
Singh et al.

(10) Patent No.: US 12,056,401 B2
(45) Date of Patent: Aug. 6, 2024

(54) MACHINE LEARNING FOR LOCAL CACHING OF REMOTE DATA IN A CLUSTERED COMPUTING ENVIRONMENT

(71) Applicant: Nutanix, Inc., San Jose, CA (US)

(72) Inventors: Bhawani Singh, Bangalore (IN); Tony Joseph, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 170 days.

(21) Appl. No.: 16/528,484

(22) Filed: Jul. 31, 2019

(65) Prior Publication Data

US 2020/0310658 A1 Oct. 1, 2020

Related U.S. Application Data

(60) Provisional application No. 62/825,698, filed on Mar. 28, 2019.

(51) Int. Cl.
*G06F 3/06* (2006.01)
(52) U.S. Cl.
CPC ............ *G06F 3/067* (2013.01); *G06F 3/0614* (2013.01); *G06F 3/0655* (2013.01)
(58) Field of Classification Search
CPC ............... G06F 11/00; G06F 11/3452; G06F 11/1096; G06F 3/0614; G06F 3/0655; G06F 3/067; H04L 67/1097; H04L 67/1001; H04L 67/1034; G06V 10/758
See application file for complete search history.

(56) References Cited

U.S. PATENT DOCUMENTS

| | | | |
|---|---|---|---|
| 6,986,076 B1 | 1/2006 | Smith et al. | |
| 7,228,460 B2 | 6/2007 | Pomaranski et al. | |
| 7,451,210 B2 | 11/2008 | Gupta et al. | |
| 7,730,364 B2 | 6/2010 | Chang et al. | |
| 8,549,518 B1 | 10/2013 | Aron et al. | |
| 8,601,473 B1 | 12/2013 | Aron et al. | |

(Continued)

OTHER PUBLICATIONS

Logical to Physical Quiz, COP4610 Florida State University—Department of Computer Science (Fall 2003) (Year: 2003).*

(Continued)

*Primary Examiner* — Michael Krofcheck
(74) *Attorney, Agent, or Firm* — Vista IP Law Group, LLP

(57) ABSTRACT

Clustered computing system monitoring, fault prediction and remediation. The disclosed techniques are used for predicting an impending occurrence of a fault. Prediction techniques involve gathering historical data pertaining to storage I/O operations performed in a clustered computing system. Ongoing storage I/O operations that are performed when a first node accesses data in local storage device as well as ongoing storage I/O operations that are performed when the first node accesses data in a remote storage device of a second node are monitored over time. On an ongoing basis, the monitored storage I/O operations are analyzed to identify impending remediable events. Before recurrence of a predicted impending remediable event, conditions that are known to have been present at the time of a historical fault are ameliorated. In some embodiments, avoidance of an impending remediable event is accomplished by moving data stored at a remote storage device to a local storage device.

24 Claims, 13 Drawing Sheets

(56) References Cited

U.S. PATENT DOCUMENTS

| | | | |
|---|---|---|---|
| 8,850,130 | B1 | 9/2014 | Aron et al. |
| 8,903,983 | B2 | 12/2014 | Bakman et al. |
| 9,298,376 | B2 | 3/2016 | Colgrove et al. |
| 9,379,994 | B2 | 6/2016 | Wray |
| 9,483,431 | B2 | 11/2016 | Bergsten et al. |
| 9,485,160 | B1 | 11/2016 | Brooker et al. |
| 9,542,296 | B1* | 1/2017 | Engers .................... G06F 11/00 |
| 9,575,784 | B1 | 2/2017 | Aron et al. |
| 9,594,521 | B2 | 3/2017 | Blagodurov et al. |
| 9,594,620 | B2 | 3/2017 | Xia et al. |
| 9,772,866 | B1 | 9/2017 | Aron et al. |
| 2009/0080428 | A1 | 3/2009 | Witkowski et al. |
| 2013/0111077 | A1 | 5/2013 | Gowravaram et al. |
| 2014/0164548 | A1* | 6/2014 | Cudak .................... G06F 16/70 709/213 |
| 2014/0189443 | A1 | 7/2014 | Xu et al. |
| 2014/0317206 | A1 | 10/2014 | Lomelino et al. |

OTHER PUBLICATIONS

Memory: Paging. CS 4410 Operating Systems, Cornell University (Summer 2011) (Year: 2011).*
Definition of Reproduce, "The American Heritage Dictionary of the English Language," 2022, HarperCollins Publishers, https://www.ahdictionary.com/word/search.html?q=reproduce (Year: 2022).*
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
Fekade, B. et al., "Clustering hypervisors to minimize failures in mobile cloud computing", *Wirel. Commun. Mob. Comput.*, (Feb. 20, 2017).
Rajachandrasekar, R., "Monitoring and Predicting Hardware Failures in HPC Clusters with FTB-IPMI", *International Parallel and Distributed Processing Symposium Workshops*, (May 21, 2012).

Nagarajan, A. B., "Proactive fault tolerance for HPC with Xen virtualization", *ICS '07: Proceedings of the 21st annual international conference on Supercomputing*, (Jun. 2007).
VMware, "Self-Driving Operations by VMware vRealize Operations", Datasheet, (Apr. 11, 2019).
VMware, "Architecture and Design: VMware Validated Design 4.0", VMware, Inc., (Jan. 11, 2018), date retrieved from google.
Xu, Y., et al., "Improving Service Availability of Cloud Systems by Predicting Disk Error", *Proceedings of the 2018 USENIX Annual Technical Conference (USENIX ATC '18)*, (Jul. 11-13, 2018).
Zhang, K., et al., "Automated IT System Failure Prediction: A Deep Learning Approach", *2016 IEEE International Conference on Big Data (Big Data)*, (Dec. 5-8, 2016).
Dataon, "Infrastructure Visibility, Monitoring, and Management for Windows Server 2016", Datasheet, (Oct. 2018).
"Isilon cluster", EMC Corporation, (May 1, 2016) (Publication date based on indicated capture date by Archive.org; first publication date unknown).
"Storage pools overview", EMC Corporation, (May 1, 2016) (Publication date based on indicated capture date by Archive.org; first publication date unknown).
Jolley, T., "Dell EMC Isilon Insightiq", Dell EMC Data Sheet, (Jan. 20, 2017).
IBM, "Overview of IBM Spectrum Scale", IBM Knowledge Center, (Updated Nov. 2018).
NetApp, "OnComand Insight Storage Resource Management for brokering and monitoring of on-premise and cloud-based storage", Datasheet (May 25, 2012).
NetApp, "NetApp Active IQ", Solution Brief, (Jun. 1, 2020).
Elliott, M. et al., "Machine Learning, Deep Learning and Prescriptive Analytics: What's the Difference?", NetApp Blog, (Jan. 10, 2018).
NetApp-Manishc, "Active IQ Digital Advisor Documentation", NetApp, (Jul. 17, 2020).
NetApp, "Active IQ", NetApp, (May 16, 2020), date retrieved from google.
Padmakumari, P. et al., "Hybrid Fault Tolerant Scheme to Manage VM Failure in the Cloud", *Indian Journal of Science and Technology*, vol. 9(48), DOI: 10.17485/ijst/2016/v9i48/108024, (Dec. 2016).
Hadi, A. A. et al., "Detecting Failures in HPC Storage Nodes", *International Journal of Scientific & Engineering Research*, vol. 7, Issue 1, (Jan. 2016).
Hosseini, S. M. et al., "Fault-Tolerance Techniques in Cloud Storage: A Survey", *International Journal of Database Theory and Application*, vol. 8, No. 4 (Aug. 2015).
Qasem, G. M. et al., "Proactive Fault Tolerance in Cloud Data Centers for Performance Efficiency", International Journal of Pure and Applied Mathematics, vol. 117, No. 22, (2017).
Gupt, D., "A Proposed Framework for Fault Prediction and Monitoring in Cloud Environment", Computer Science and Engineering Department, Thapar University, (Jul. 2013).
Cevey, M. "NetApp Active IQ: Solving Today's Problems and Uncovering Tomorrow's Opportunities", NetApp blog, (Mar. 25, 2019).
NetApp, "Active IQ: The Evolution of AutoSupport", Active IQ infographic, (Nov. 2017).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix

(56) References Cited

OTHER PUBLICATIONS

Validated Solutions, Prepared by: Citrix APAC Solutions, dated Jun. 25, 2014.

* cited by examiner

MACHINE LEARNING FOR LOCAL CACHING OF REMOTE DATA IN A CLUSTERED COMPUTING ENVIRONMENT

RELATED APPLICATIONS

The present application claims the benefit of priority to U.S. Provisional Patent Application Ser. No. 62/825,698 titled "DECENTRALIZED FAULT PREDICTION AND REMEDIATION", filed on Mar. 28, 2019, which is hereby incorporated by reference in its entirety.

FIELD

This disclosure relates to computing system monitoring, and more particularly to techniques for local caching of remote data in a clustered computing environment.

BACKGROUND

Computing systems continue to become more and more important to the day-to-day workings of business and society. As such, the users of these modern computing systems demand that the systems perform reliably and without interruption. As the importance of computing systems in the day-to-day workings of business and society has increased, so has the complexity of those computing systems. The increased complexity is often matched with many more hardware and software components that can fail. As additional hardware and software components that can fail are integrated into a computing system, the likelihood of occurrence of computing system faults increases in relation to the failure rates of the additional hardware and software components.

Many technologies have been applied in attempts to understand and/or prevent such computing system faults. For example, a system monitoring capability might be added to a computing system such that conditions in the computing system can be captured, classified, and logged. As such, when the computer system suffers some fault event, the observed conditions can be forensically analyzed to determine patterns or conditions that could be used in the future to predict an impending fault. For example, if a monitored system suffered five disk drive fault events, and the forensic analysis determined that in each of those fault events a pattern comprising four bad reads of a disk drive segment in a time period just before the fault, then it might emerge that an occurrence of some number of bad reads within a particular time period is a good predictor of an impending disk drive fault.

Many of the aforementioned modern computer systems are architected to be highly scalable in multiple dimensions. Specifically, modern hyperconverged distributed systems are physically scaled by adding more nodes (e.g., for more computational power), more storage devices (e.g., for more storage capacity), more networking interfaces (e.g., for more networking bandwidth), and more of other computing resources for scaling of other computing capabilities (e.g., for graphics acceleration). Such hyperconverged distributed systems are also scaled in a virtual sense by adding various types of virtualized entities (e.g., virtual machines, virtual disks, virtual NICs, etc.) that emulate the underlying physical computing resources to facilitate their usage as virtualized computing components.

For example, the physical storage devices of the multiple nodes of a computing cluster can constitute a storage pool of virtual disks (vDisks) attached to virtual machines (VMs) that run on the nodes. Deployment of such virtual machines can be easily scaled as demand increases. As such, a single node can host hundreds or thousands of VMs. Moreover, in such hyperconverged distributed systems, any one node can communicate with every other node in the system, any of which other nodes may themselves host hundreds or thousands of VMs. As such, the range of possible conditions and events that could be monitored, logged, and forensically analyzed has exploded. This situation becomes further complicated when considering that users of these hyperconverged distributed systems demand extremely high availability of all features of the system. Accordingly, centralized functions of any sort are eschewed, thus rendering centralized monitoring, logging, and analysis untenable. An alternative approach is to monitor, log, and forensically analyze every event at every node. This approach, however is also untenable, at least in that the computational and storage expense of performing monitoring, logging and analyzing every event at every node unwantedly impacts the overall performance of the hyperconverged distributed systems.

Unfortunately, due to the aforementioned high availability requirements and/or due to the aforementioned performance requirements, techniques for system monitoring, logging and pattern matching forensics are deficient. Specifically, the aforementioned logging and pattern matching forensics fail to proactively avoid faults that are known to occur and re-occur as a consequence of how data storage is distributed across many nodes of hyperconverged distributed systems. What is needed are techniques that can efficiently perform proactive remediation of faults in hyperconverged distributed systems.

SUMMARY

The present disclosure describes techniques used in systems, methods, and in computer program products that employ machine learning to initiate local caching of remote data in a clustered computing environment, which techniques advance the relevant technologies to address technological issues with legacy approaches. More specifically, the present disclosure describes techniques used in systems, methods, and in computer program products that employ machine learning to initiate local caching of remote data in clustered computing environments. Certain embodiments are directed to technological solutions for decentralized analysis of combined intra-node and inter-node observations independently collected from the nodes of a hyperconverged distributed system to predict impending faults in the system.

The disclosed embodiments modify and improve over legacy approaches. In particular, the herein-disclosed techniques provide technical solutions that address the technical problems attendant to predicting impending faults in hyperconverged distributed computing environments. Such technical solutions involve specific implementations (i.e., data organization, data communication paths, module-to-module interrelationships, etc.) that relate to the software arts for improving computer functionality. Specifically, the ordered combination of steps of the embodiments serve in the context of practical applications that perform decentralized analysis of combined intra-node and inter-node observations independently collected from the nodes. The combined intra-node and inter-node observations are used to predict impending faults in the system. As such, techniques for decentralized analysis of combined intra-node and inter-node observations that are independently collected from the nodes serve to overcome unsolved technological problems associated with predicting impending fault conditions in computer systems.

Rather than expend resources to recover from certain remediable events in a hyperconverged distributed system after the faults have occurred, the herein disclosed techniques facilitate prediction of such remediable events before they occur, thereby eliminating unnecessary expenditure of resources. More specifically, the consumption of computing, storage, networking, and other resources to identify the root causes of a remediable event, carry out various remediation operations, and/or perform other computing operations to recover from certain remediable events that occur over the numerous virtual and physical resources of a hyperconverged distributed system is eliminated.

Many of the herein-disclosed embodiments for a decentralized analysis of combined intra-node and inter-node observations independently collected from the nodes of a hyperconverged distributed system to predict impending faults in the system are technological solutions pertaining to technological problems that arise in the hardware and software arts that underlie the implementation and operation of high-availability computing systems. Aspects of the present disclosure achieve performance and other improvements in peripheral technical fields as well, including (but not limited to) hyperconverged computing platform management and massively parallel virtualized computing systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
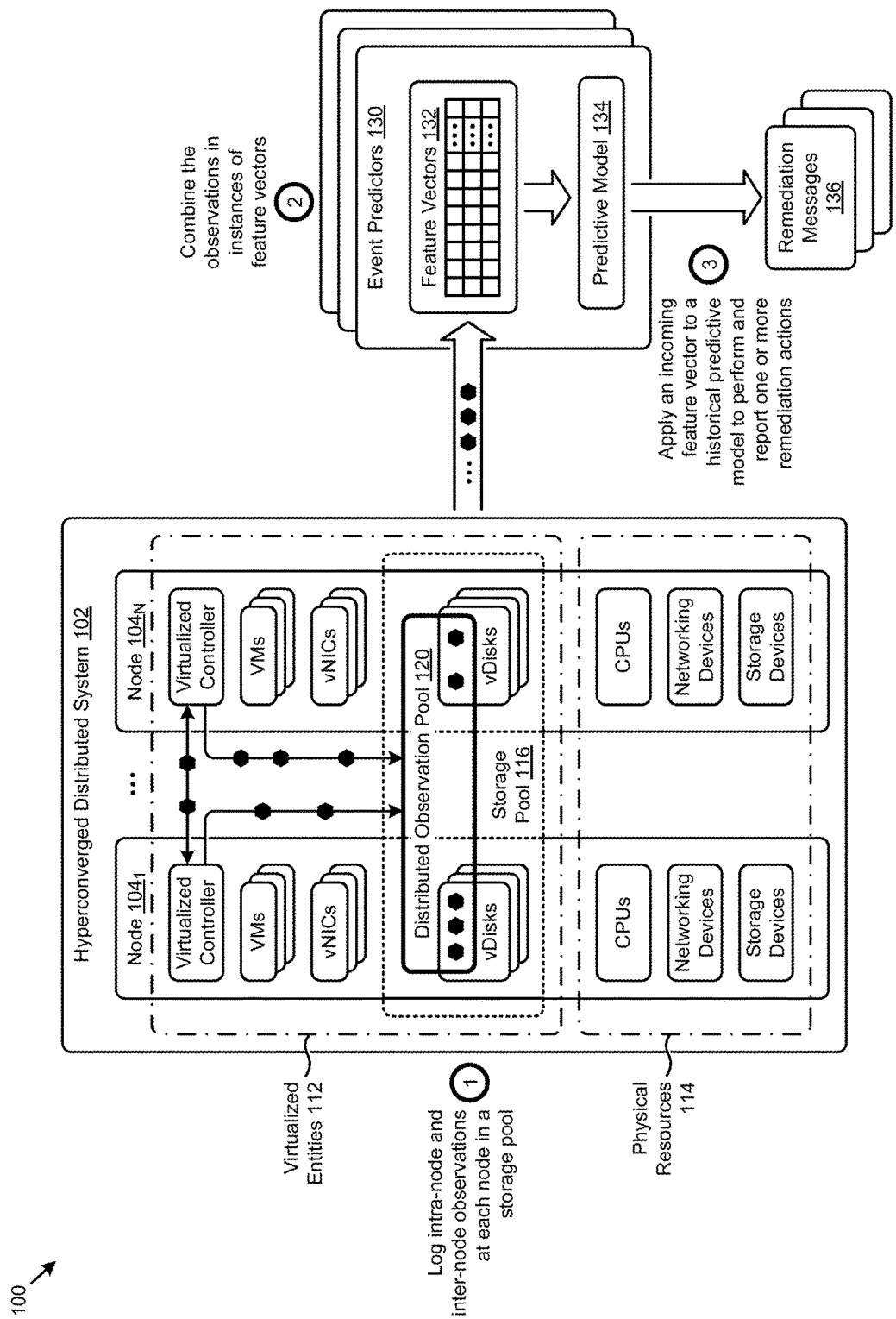
FIG. 1 exemplifies a computing environment in which embodiments of the present disclosure can be implemented.

Aspects of the present disclosure solve problems associated with using computer systems for predicting impending faults in hyperconverged distributed computing environments. These problems are unique to various computer-implemented methods for predicting impending faults in distributed computing environments. Some embodiments are directed to approaches for a decentralized analysis of combined intra-node and inter-node observations that are independently collected from the nodes of a hyperconverged distributed system and then used to predict impending faults. More specifically, in hyperconverged distributed systems that implement a storage pool formed of a collection of node-specific storage devices, any given subject node will process storage I/O that arises from peer nodes (i.e., inter-node storage I/O commands) in addition to processing storage I/O commands that arise from CPU processing at the subject node (i.e., intra-node storage I/O commands). As such, the subject node is in a position to independently collect storage I/O observations from peer nodes and to then use the collected observations to independently predict impending faults. As such, any given node can raise an indication of an impending fault based solely on the observations collected at that particular subject node.

The accompanying figures and discussions herein present example environments, systems, methods, and computer program products that employ machine learning to initiate local caching of remote data in clustered computing environments.

Overview

Hyperconverged distributed computing clusters comprise many physically independent computing nodes that are tightly coupled by inter-node communications. The inter-node communications facilitate, at least in part, storage I/O (input/output or IO) operations over a storage pool that spans the nodes using a storage pool that is accessed by the nodes using a common contiguous virtual address space.

For example, a VM implemented on a first node can perform a storage I/O operation that writes data to a virtual address that refers to a physical storage device on a second node. In such hyperconverged distributed computing systems, there is a large amount of inter-node communication that is not present in systems that do not implement a shared storage pool. More particularly, since a storage pool is a collection of storage devices—including node-local storage and any forms of network-attached storage—that are collected to form a logically-contiguous address space across a plurality of nodes of a cluster, and since any node can access any address within the logically-contiguous address space of the cluster, this means, for example, that an I/O raised at a first node may be routed to another node that handles I/Os for the particular storage device corresponding to the storage pool address of the I/O. As such, this architecture is characterized by a high amount of inter-node activity.

The presence of such inter-node activity offers an opportunity to collect observations pertaining to certain system conditions and/or events that do not occur in systems that do not have a shared storage pool and/or that do not have distributed computing resources. Moreover, the existence of virtualized entities that map to physical resources of the hyperconverged distributed system greatly enriches the corpus of possibilities for capturing inter-node and intra-node observations.

Collecting and analyzing such a rich corpus of observations (e.g., physical and virtualized entity performance measurements, configuration changes, system faults, etc.) and actually storing those observations in a manner that can be used to predict impending faults present challenges to be overcome.

Specifically, in many of the disclosed embodiments, all of the nodes in a computing system perform their own independent system monitoring, observation recording, and forensic analysis. As such, all of the nodes agree on a common form of data representation as well as agree on a common storage area that is accessible by each of the nodes. In some cases, all of the nodes may have to agree on a mechanism for leadership such that reporting of predictions and/or remediation recommendations are not duplicated or in conflict.

Exemplary hyperconverged distributed computing architectures implement a virtualized controller at each node. All storage and other I/O operations of the system are routed through at least one virtualized controller. In most cases, a particular I/O operation of the system is routed through two or more virtualized controllers. Given this architecture, observations are made by each virtualized controller, and recording (e.g., logging) of the observations is at least initiated by each virtualized controller. An amalgamation of observations taken by each of the distributed virtualized controllers is stored in a shared storage pool accessible by each node. As such, each and every node of the cluster can have contemporaneous access to the intra-node observations and inter-node observations taken at every other node. Moreover, each node can make predictions independently and/or issue remediation messages (e.g., recommendations) in a decentralized manner.

For example, one bad read of a disk drive segment in a storage pool observed at a first node may not, by itself, raise an indication of an impending fault (e.g., may not, by itself, breach a node-specific threshold at the first node), and two bad reads of the same disk drive segment observed at a second node may also not raise an indication of an impending fault (e.g., may not, by itself, breach a node-specific threshold at the second node). However, the combined observations accessed at a third node (or any node) might raise an indication of an impending fault (e.g., because the combination of faults breaches a threshold). As such, combinations of observations collected by independent nodes of a system improves the ability to predict a fault or any remediable event. Improvements in fault prediction corresponds to earlier warnings of impending faults or other remediable events, which in turn leads to expansion of remediation possibilities that can be acted upon before serious system faults (e.g., outages) can occur.

Disclosed herein are techniques for a decentralized analysis of combined intra-node and inter-node observations independently collected from the nodes of a hyperconverged distributed system to predict impending faults in the system. In certain embodiments, a virtualized controller at each of the nodes continuously logs observations related to intra-node and inter-node events, conditions, faults, and/or other system attributes that are observable by each virtualized controller. The observation logs from the individual nodes are recorded in a storage pool for access by any of the virtualized controllers. At one or more of the virtualized controllers, the observations from the individual nodes are classified and combined (e.g., aggregated) into feature vectors.

A selected set of historical features vectors is used to define a predictive model that correlates conditions and/or condition patterns with certain remediable events (e.g., faults). Instances of feature vectors generated from recently recorded observations are applied to the predictive model to determine whether one or more remediable events might be impending. If an impending remediable event is identified, one or more remediation messages are generated to facilitate prevention of the impending remediable event.

As used herein, impending remediable event refers to a data item that corresponds to a record of an occurrence of a condition or conditions on a computing node, which condition or conditions had occurred temporally prior to an observed fault. In exemplary embodiments, the condition or conditions that had occurred temporally prior to an observed fault can be recognized before a repeat occurrence of the fault, and as such, remedial action can be taken to avoid the fault.

In certain embodiments, a remediation message might be delivered to one or more agents of the hyperconverged distributed system and/or presented (e.g., at a user interface) to one or more users to confirm or carry out the remediation. In certain embodiments, a remediation message might be delivered to one or more agents of the hyperconverged distributed system and/or presented (e.g., at a user interface) after the system has autonomously carried out actions to cause the remediation.

In certain embodiments, definition of and/or use of the predictive model are performed using machine learning capabilities that are hosted externally to the hyperconverged distributed system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to a decentralized analysis of combined intra-node and inter-node observations independently collected from the nodes of a hyperconverged distributed system to predict impending faults in the system. Specifically, the figure presents a logical depiction of how the herein disclosed techniques can be implemented in a hyperconverged distributed computing environment to implement remediation of an impending fault by initiating local caching of remote data.

The logical depiction of FIG. 1 illustrates a hyperconverged distributed system 102 that comprises two representative computing nodes (e.g., node $104_1$ and node $104_N$) having respective instances of physical resources 114 (e.g., CPUs, networking devices, storage devices, etc.). Various instances of virtualized entities 112 are implemented at the nodes. Virtualized entities 112 are entities that emulate certain portions and/or combinations of the underlying shared physical resources (e.g., physical resources 114) of the nodes to facilitate usage as autonomous computing components. For example, such virtualized entities might include virtual machines (VMs), virtual disks (vDisks), virtual network interface cards (vNICs), executable containers (ECs), availability zones (AZs), and/or other entities. As described herein, the operation of some virtualized entities (e.g., VMs) is facilitated by hypervisors.

As be observed, the vDisks of virtualized entities 112 can form a storage pool 116 associated with hyperconverged distributed system 102. A virtualized controller (e.g., implemented as a VM, EC, etc.) at each node facilitates access to storage pool 116. For example, the I/O operations between a VM and an attached vDisk at a particular node are performed by the virtualized controller at the node. The data of the vDisks in storage pool 116 are often distributed over the physical storage devices of multiple nodes of hyperconverged distributed system 102. In such cases a virtualized controller at one node might coordinate with a virtualized controller at another node to carry out certain inter-node I/O operations (e.g., a write to a storage device at a remote node) as well as intra-node I/O operations (e.g., a write to a storage device at a local node). The virtualized controllers can be involved in other intra-node and/or inter-node activities such as activities related to virtualized entity management (e.g., creation, deletion, migration, etc.), data replication, and/or other functions. As such, the virtualized controllers are privy to various aspects of their respective nodes such as the conditions, configurations, performance, activities, events, and/or other characteristics associated with both the virtualized entities and physical resources at the nodes.

As earlier described, the users of computing systems such as hyperconverged distributed system 102 demand that the systems perform reliably and without interruption. However, techniques for understanding and/or preventing computing system faults have not kept pace with the emergence of hyperconverged distributed computing architectures as represented by hyperconverged distributed system 102. The herein disclosed techniques address the problems attendant to predicting impending faults in hyperconverged distributed computing environments as depicted in the embodiment of FIG. 1.

Specifically, the virtualized controllers at each of the nodes are configured to log intra-node observations and inter-node observations at each of the nodes in a distributed observation pool 120 at storage pool 116 (operation 1). Any of the observations stored in distributed observation pool 120 are accessible by any of the virtualized controllers. Observations such as the intra-node observations, inter-node observations, or other observations referred to herein, are a collection of one or more attributes that describe some aspect of a computing system. For example, observations at a computing system might pertain to the operating conditions, the configuration, the performance, and/or the activities of the computing system at some moment in time. In the case of the hyperconverged distributed system 102, the observations can pertain to the conditions, configurations, performance, activities, events, and/or other characteristics associated with both the virtualized entities and physical resources at the nodes of hyperconverged distributed system 102. As earlier described, such observations might correspond to inter-node aspects (e.g., captured in inter-node observations) or intra-node aspects (e.g., captured in intra-node observations) of hyperconverged distributed system 102.

As described herein, one particular class of observations comprises remediable events. Remediable events, as used herein, are events associated with a computing system that are identified as being remediable. Remediation of a remediable event is desired to be performed prior to the remediable event taking place so as to prevent what might be serious consequence that arise from occurrence of the remediable event. A remediation event can be associated with one or more virtualized entities, one or more physical resources, or any combination thereof. For example, a first remediable event might correspond to a virtual vNIC fault, while a second remediable event might correspond to a physical NIC fault. The severity of the remediable events can also vary. In the case of the foregoing vNIC fault, the fault can be remediated by automatically assigning the vNIC to another underlying physical NIC at the node. In this case, the remediable event (e.g., vNIC fault) might be considered to have a medium severity based at least in part on its impact on availability and performance. In contrast, a node failure (e.g., due to lack of power to the node) might be a remediable event that is considered to have a high severity at least in terms of its impact on availability and performance.

To facilitate prediction and remediation of such remediable events according to the herein disclosed techniques, the observations collected in distributed observation pool 120 are combined into instances of feature vectors for analysis (operation 2). As shown, instances of event predictors 130 can be implemented to manage the collection of the observations and formation of feature vectors 132. As use herein, a feature vector is an n-dimensional collection of numerical values that represent associated sets of variables (e.g., independent variables, dependent variables, input variables, output variables, etc.). For example, the variables and/or respective values might be derived from the observations of distributed observation pool 120. Specifically, a feature vector from feature vectors 132 might comprise a set of conditions and remediable events (if any) derived from observations recorded at some moment in time. As further indicated in FIG. 1, feature vectors 132 can be used to define a predictive model 134. For example, a set of historical instances of feature vectors 132 might be used to determine the predictive model 134.

Certain instances of feature vectors 132 (e.g., then-current feature vectors) are then applied to predictive model 134 (e.g., that comprises a history of feature vectors) to perform one or more remediation actions and/or to report one or more remediation messages 136 (operation 3). As used herein, a remediation message is a set of information (e.g., instructions, entity metadata, etc.) that describes certain actions to take, or that have been already taken, to prevent occurrence of one or more impending faults. In some cases, a remediation message is structured to be interpreted by one or more agents at a computing system (e.g., hyperconverged distributed system 102) to perform the preventative or restorative actions such as moving data from one node to another node or such as migrating a virtual machine (VM) from one node to another node. In other cases, a remediation message is structured to present instructions or alerts to a user at a user interface.

The foregoing remediable event (e.g., fault) prediction and remediation capabilities facilitated by the herein disclosed techniques results in improvements in computer functionality that serve to reduce the demand for computer processing power, reduce the demand for computer memory and data storage, reduce network bandwidth use, and reduce the demand for inter-component communication in computing environments.

Specifically, rather than expend resources to recover from certain remediable events in a hyperconverged distributed system after they have occurred, the herein disclosed techniques facilitate prediction of such remediable events before they occur, thereby eliminating the foregoing expenditure of resources. More specifically, the consumption of computing, storage, networking, and other resources to identify the root causes of a remediable event, and/or carry out various remediation operations, and/or perform other computing operations to recover from certain remediable events that occur over the numerous virtual and physical resources of a hyperconverged distributed system is eliminated.

One embodiment of techniques for such decentralized fault prediction and remediation is disclosed in further detail as follows.

Figure 2:
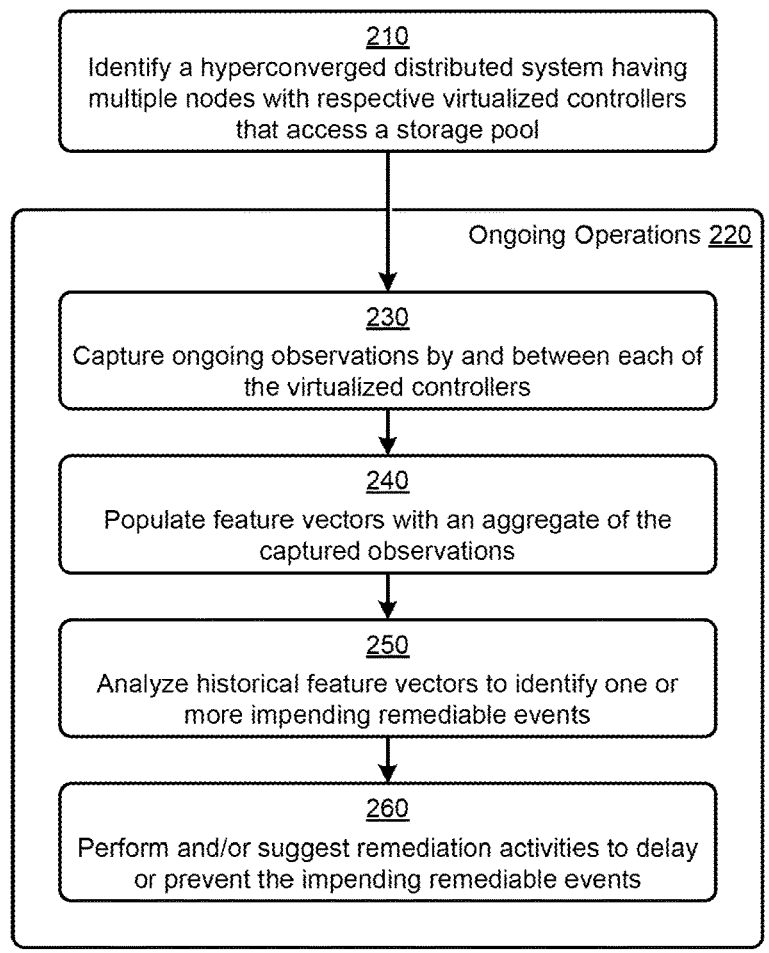
FIG. 2 presents a decentralized fault prediction technique as implemented in systems that facilitate use of machine learning to initiate local caching of remote data in clustered computing environments, according to an embodiment.

FIG. 2 presents a decentralized fault prediction technique 200 as implemented in systems that facilitate use of machine learning to initiate local caching of remote data in clustered computing environments. As an option, one or more variations of decentralized fault prediction technique 200 or any aspect thereof may be implemented in the context of the architecture and functionality of the embodiments described herein. The decentralized fault prediction technique 200 or any aspect thereof may be implemented in any environment.

FIG. 2 illustrates aspects pertaining to a decentralized analysis of combined intra-node and inter-node observations independently collected from the nodes of a hyperconverged distributed system to predict impending faults in the system. Specifically, the figure is presented to illustrate one embodiment of certain high order steps and/or operations that facilitate determining one or more impending remediable events (e.g., faults) from observations collected over a hyperconverged distributed system. As illustrated, a selected portion of the operations comprise a set of ongoing operations 220. The shown set of ongoing operations bound some or all of the included operations that are continuously performed, either individually and/or as a group.

Decentralized fault prediction technique 200 can commence with identifying a hyperconverged distributed system having multiple nodes with respective virtualized controllers that can access a storage pool at the system (step 210). Such a hyperconverged distributed system might be a computing cluster comprising multiple nodes distributed over various physical locations. The distributed computing, storage, networking, and/or other capabilities of the underlying physical resources of the nodes are converged with a virtualization layer to facilitate scalable implementation of virtualized entities, including the virtualized controllers and virtual disks of the storage pool. As part of ongoing operations 220, observations from each of the virtualized controllers are recorded in the storage pool (step 230). For example, an agent (e.g., health monitor) at each virtualized controller might continuously listen for and record observations that are accessible by the virtualized controller. Various instances of feature vectors are populated from an aggregate of the observations captured at the nodes and stored in the storage pool (step 240). The observations are aggregated to, for example, include any inter-node effects associated with the observations.

The feature vectors are analyzed to determine one or more impending remediable events at the system (step 250). As an example, certain feature vectors associated with recently captured observations might be applied to a predictive model derived from historical observations to determine any impending remediable events. One or more remediation messages are performed and/or suggested so as to prevent the occurrence of one or more impending remediable events (step 260). For example, an impending remediable event might be prevented from occurring by proactively moving certain data stored at one storage device to a different storage device. Or, for example, an impending remediable event might be prevented from occurring by proactively migrating a virtual machine at one node to a different node.

Remediation messages might be presented to various agents of the hyperconverged distributed system and/or to users (e.g., system administrators) associated with the system.

The operations corresponding to step 230, step 240, step 250, and step 260 can be performed in any order and/or all or portions of the ordered operations can be performed at any node and/or in any configuration of a hyperconverged distributed system. As one example, step 230 can serve for gathering historical data pertaining to storage I/O operations that are performed on the hyperconverged distributed system (e.g., a hyperconverged distributed system where the hyperconverged distributed system comprises a plurality of nodes, individual ones of the plurality of nodes having respective corresponding virtualized controllers that access a common storage pool).

In this and other configurations the nodes support data-locality awareness when executing processes. As an example of data-locality awareness, a computer processes executing on a particular node can determine whether the data acted upon by the process is locally stored (e.g., on a storage device local to the particular node), or if the data acted upon by the process is stored in a remote location in the storage pool. After making such a determination, further processing can take different execution paths based on the determined data-locality awareness. Moreover, the different execution paths can be determined based on historical data.

Specifically, step 240 can collect historical data by making observations over time and storing such observations as stored historical data, which stored historical data can be accessed by the computer process when determining an execution path.

Continuing this example, step 250 analyzes the historical data to determine a likelihood of occurrence of an impending remediable event if the data acted upon by the process is not locally stored. If the likelihood breaches a threshold, then step 260 serves for presenting a remediation message pertaining to the impending remediable event.

To illustrate, consider a scenario where data that is stored in a remote location in the storage pool is accessed repeatedly throughout the day (e.g., once each hour). And further consider the case where the observations taken over time includes several occurrences where access to the remote data is statistically correlated to an unwanted I/O fault (e.g., an I/O fault that occurs repeatedly at, for example, 9:00 PM each day). Still further consider the case where the observations taken over time includes several occurrences where accesses to the same data was made to a node-local cache, which accesses may or may not have been statistically correlated to the I/O fault. In such a scenario, the impending I/O fault can be remediated by proactively bringing the remote data to a node-local storage area (e.g., into the aforementioned node-local cache) before a next occurrence of the access (e.g., the 9:00 PM access) that had been statistically correlated to the unwanted impending I/O fault. The foregoing example is merely one example that can be remediated by proactively bringing the remote data to a node-local storage area before a repeat occurrence of an unwanted impending I/O fault.

The architecture of hyperconverged systems give rise to many more situations where an unwanted events might occur. Specifically, whereas some architectures separate storage-centric functions from compute-centric functions, any given node in a hyperconverged system is configured to support storage-centric functions, compute-centric functions and networking functions. As such, addition of a new node to a hyperconverged system brings to bear not only new computing resources but also new storage resources.

The extensibility of storage resources by adding a node is facilitated by setting up a common address space to access data. When adding a new node with new storage resources, the common address space can be extended to map in an address range that covers the storage space of the newly added node. This makes it easy for an application to expand. That is, using such a common address space, any application can access any data on any node merely by addressing the data by its location in the common address space. Furthermore, when a common address space is overlaid over any of a variety of local storage devices of the nodes, any data at any storage device that is mapped into the common address space can be accessed from any node using a corresponding address range.

This ease of extensibility in the dimensions of computing resources, storage resources, and networking resources (e.g., by adding a node) gives rise to frequent of movement (e.g., migration) of virtualized entities from one node to another node. Such movement of a virtualized entity from one node to another node might be made on the basis of load balancing considerations, or might be made for reasons pertaining to scheduled maintenance (to make a hardware change to a node), or might be made for performance considerations or other reasons.

Unfortunately, these techniques for extensibility brings with them new types of computing faults. Specifically, given that data of an application might be spread out over many storage devices of many nodes (e.g., over many different ranges of the common address space), it can happen that an application that is running on a first node might need data that is located on a different node. Accessing data on a different node introduces additional complexities since the data at remote nodes is accessed over a network. This additional complexity is accompanied with additional computing resources being required, at least for the purpose of carrying out networking protocols.

Consider a case where a 'large' application runs on a daily schedule (e.g., from 6:00 pm to 8:00 pm), and consider that this application runs on a first node and accesses data on many other nodes. The computing resources (e.g., CPU) on this node that hosts this large application might be fully utilized during execution. As such, another application running on the same node might be starved for computing resources and might timeout or fault out as a consequence. This situation can be observed and conditions present at the time can be stored in a historical dataset. The historical data can be accessed at a later time to assess if that timeout or fault out event might again occur. If an impending fault can be detected before a reoccurrence, it might be able to be remediated so it does not occur again.

Consider a different example of an application that uses one address range (e.g., 00000000 through 0001111) within the common address space to access a storage device of a first node, and can use a different, non-overlapping address range (e.g., 00010000-00011111) within the common address space to access a storage device of a second node. As earlier described, it can happen that an application can run on any node in the hyperconverged distributed system, including on a node that is network-wise distant from data that is needed by the application. In some situations, the network-wise distance between the node where the application is running and the data needed by the application leads to non-optimal performance of the application (e.g., where the network-wise distance introduces data access latency). This situation is further complicated by the fact that in hyperconverged distributed systems, both data and applications are indeed frequently moved, leading to a relatively high occurrence of situations where an application is relocated to a node that is network-wise distant from the data needed by the application.

In many cases this network-wise distance can result in deleterious effects on the application and/or can even lead to system crashes. For example, a virtual machine that implements an application for managing isochronous data flow (e.g., for serving media such as a video) might be very sensitive to latency of data accesses to storage devices. That is, when such an application that manages isochronous data flow is co-located on the same node as the data it is serving, then storage access latency is relatively small. However, if the application were to be moved to another node that is network-wise remote from the data it is serving isochronously, the application will experience longer latencies. In some cases, these longer latencies may give rise to system bottlenecks and in some cases these longer latencies may give rise to system crashes. Fortunately, using the herein-disclosed techniques, conditions of the system (e.g., conditions of an application experiencing longer latencies) can be collected and analyzed on an ongoing basis, and in many situations an impending deleterious event (e.g., a crash) can be predicted in time to take remedial action.

A system for deleterious event prediction is shown and discussed as follows.

Figure 3:
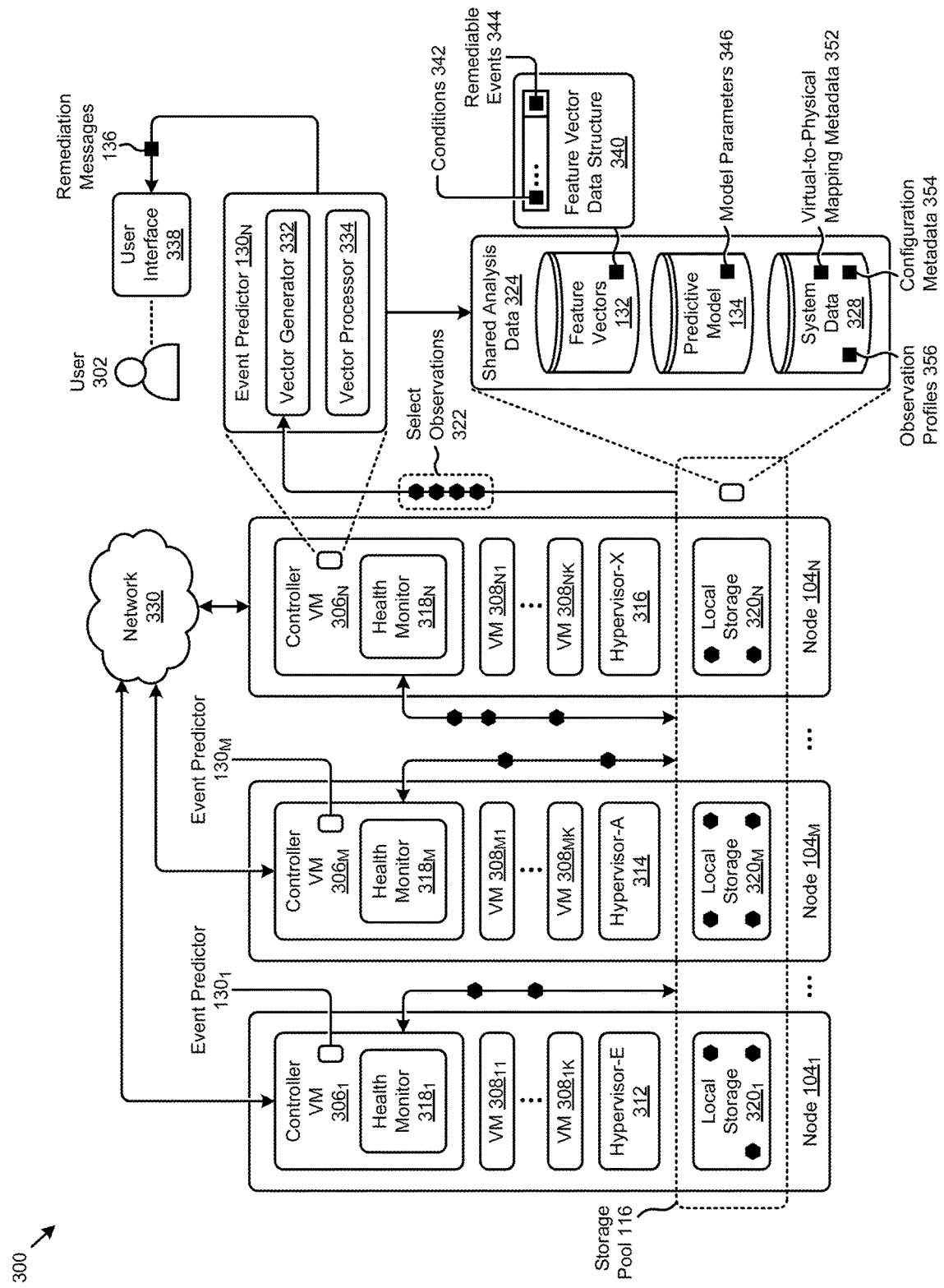
FIG. 3 is a block diagram of a system that implements decentralized fault prediction and remediation in distributed computing environments, according to an embodiment.

FIG. 3 is a block diagram of a system 300 that implements decentralized fault prediction and remediation in distributed computing environments. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to a decentralized analysis of combined intra-node and inter-node observations independently collected from the nodes of a hyperconverged distributed system to predict impending faults in the system. Specifically, the figure is being presented to show one embodiment of certain representative components and associated data flows that describes how the herein disclosed techniques might be implemented in a modern computing system (e.g., hyperconverged distributed system). The components and data flows shown in FIG. 3 present one partitioning and associated data manipulation approach. The specific example shown is purely exemplary, and other subsystems, data structures, and/or partitionings are reasonable.

As shown in FIG. 3, the system 300 comprises three representative nodes (e.g., node $104_1$, . . . , node $104_M$, . . . , and node $104_N$) that have multiple tiers of storage in a storage pool 116. Each node can be associated with one server, multiple servers, or portions of a server. The nodes can be associated (e.g., logically and/or physically) with one or more computing clusters. The multiple tiers of storage of storage pool 116 can include instances of local storage (e.g., local storage $320_1$, . . . , local storage $320_M$, . . . , local storage $320_N$). For example, the local storage can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through a network 330 such as a networked storage (e.g., a storage area network or SAN, network attached storage or NAS, etc.).

As shown, any of the nodes of system 300 can implement one or more virtualized entities such as virtual machines (e.g., VM $308_{11}$, . . . , VM $308_{1K}$, VM $308_{M1}$, . . . , VM $308_{MK}$, VM $308_{N1}$, . . . , VM $308_{NK}$, controller VM $306_1$, . . . , controller VM $306_M$, . . . , and controller VM $306_N$) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 312, hypervisor-A 314, or hypervisor-X 316), which hypervisors are logically located between the various guest operating systems of the VMs and the host operating system of the physical infrastructure (e.g., the nodes).

As an alternative, executable containers may be implemented at the nodes in an operating system-based virtualization environment or container virtualization environment. The executable containers comprise groups of processes and/or resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components such as applications or services (e.g., micro-services). Any node of system 300 can implement both a hypervisor-assisted virtualization environment and a container virtualization environment for various purposes.

Furthermore, any node in system 300 can implement a virtualized controller to facilitate, at least in part, access to storage facilities (e.g., storage pool 116, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor). As can be observed in system 300, a particularly-configured instance of a virtual machine at each node (e.g., controller VM $306_1$ of node $104_1$, controller VM $306_M$ of node $104_M$, and controller VM $306_N$ of node $104_N$) is used as a virtualized controller to manage storage and I/O operations at the nodes. The controller VMs of the nodes in system 300 interact using communications over network 330.

The virtualized entities at the nodes of system 300 can interface with the controller VM of the node through a respective hypervisor. In such cases, the controller VM is not formed as part of specific implementations of a given hypervisor. Instead, the controller VM can run as a virtual machine above the hypervisor at the various nodes. When the controller VMs run above the hypervisors, varying virtual machine architectures and/or hypervisors can operate with the system 300. For example, a hypervisor (e.g., hypervisor-E 312) at one node might correspond to software from a first vendor (e.g., VMware), and a hypervisor (e.g., hypervisor-A 314) at another node might correspond to a second software vendor (e.g., Nutanix). As another virtualized controller implementation example, executable containers (e.g., Docker containers) can be used to implement a virtualized controller in an operating system virtualization environment at a given node. In this case, for example, the virtualized entities at a particular node can interface with a controller container through a hypervisor and/or the kernel of the host operating system of the node.

As earlier mentioned, in addition to managing the I/O operations, the virtualized controllers (e.g., controller VMs) are often involved in other intra-node and/or inter-node operations at their respective nodes. As such, the virtualized controllers are privy to various aspects of their respective nodes such as the conditions, configurations, performance, activities, events, and/or other characteristics associated with both the virtualized entities and physical resources at the nodes. The foregoing characteristics of the controller VMs make them good candidates for collecting the intra-node and inter-node observations according to the herein disclosed techniques. Specifically, a health monitor (e.g., health monitor $318_1$, . . . , health monitor $318_M$, . . . , health monitor $318_N$) is implemented at each controller VM to collect the observations that are observable by each controller VM. As can be observed, the health monitors capture the observations accessible at each node and use the storage PO capabilities of the controller VMs to record the observations in the local storage facilities of storage pool 116. The observations captured over all the nodes in system 300 are thereby available to any of the nodes of the system.

As illustrated, an instance of an event predictor (e.g., event predictor $130_1$, . . . , event predictor $130_M$, . . . , event predictor $130_N$) can also be implemented in each of the controller VMs to facilitate the herein disclosed techniques. The operations performed by the event predictor can be performed at a single node or multiple nodes. For example, various tasks to carry out the operations of the event predictor might be allocated (e.g., by a leader node) over multiple nodes to achieve a certain load balancing objective associated with system 300.

As shown in a representative expanded view of event predictor $130_N$, a set of select observations 322 from storage pool 116 are received at a vector generator 332. Select observations 322 might represent all of the observations to be processed, or a subset of the total observations that are specifically assigned to event predictor $130_N$ for processing. Select observations 322 can be used by vector generator 332 to populate some or all of a set of feature vectors 132 are included in a set of shared analysis data 324 stored in storage pool 116. As depicted in a feature vector data structure 340, select observations 322 can be analyzed to determine various instances of conditions 342 and remediable events 344 that are represented in feature vectors 132. Other data might be consulted by vector generator 332 when populating the feature vectors 132.

Specifically, certain shared instances of system data 328 in storage pool 116 might be accessed when forming the feature vectors 132. For example, a set of virtual-to-physical mapping metadata 352 might be accessed to determine that certain vDisk performance observations over multiple nodes should be linked in one or more feature vectors due to the vDisks being mapped to the same hard disk drive. A set of configuration metadata 354 might be accessed to include certain virtualized entity configuration information as conditions in a particular feature vector. A set of observation profiles 356 might also be accessible at storage pool 116 to associate unique observation identifiers with more detailed descriptions of the corresponding observations. In this case, a particular feature vector can be populated with the observation identifier rather than an entire object that describes the attributes of the observation (e.g., condition, remediable event, etc.).

A predictive model 134 that is accessible by event predictor $130_N$ and/or other instances of event predictors is defined based at least in part on a certain portion of the feature vectors 132. For example, a set of historical feature vectors might be analyzed by event predictor $130_N$ to define the predictive model 134.

As used herein, a predictive model is a collection of data and/or mathematical techniques (e.g., algorithms) that facilitate determining (e.g., predicting) a set of outputs (e.g., outcomes, responses) based on a set of inputs (e.g., stimuli). For example, predictive model 134 might consume a set of observed conditions as inputs to predict one or more remediable events as outputs based on a collection of historically observed conditions. In some cases, the techniques implemented by the model might comprise a set of equations having coefficients that relate one or more of the input variables to one or more of the output variables. In these cases, the equations and coefficients can be determined by a training process and/or by other processing (e.g., logistical regression) over a corpus of historical data. In other cases, the model can correlate discrete combinations of inputs (e.g., conditions) to respective combinations of outputs (e.g., remediable events). In such cases, the strength of the correlation might be codified in a correlation score that ranges, for example, from zero (e.g., no correlation) to one (e.g., perfectly correlated). Once defined, a set of model parameters 346 that describe the predictive model 134 is codified in the shared analysis data 324 of storage pool 116.

When new observations (e.g., incoming, then-current observations) are received at event predictor $130_N$, the feature vectors derived from the new observations are applied to predictive model 134 by a vector processor 334 to determine the likelihood that an impending remediable event will occur. If one or more impending remediable events are identified, one or more remediation messages might be sent to certain agents at the nodes of system 300 and/or to one or more user interfaces of respective users. For example, remediation messages 136 might be sent to a user interface 338 associated with a user 302 (e.g., system administrator of system 300).

The foregoing discussions include techniques for populating feature vectors based at least in part on the observations captured over multiple nodes (e.g., step 240 of FIG. 2), which techniques are disclosed in further detail as follows.

Figure 4:
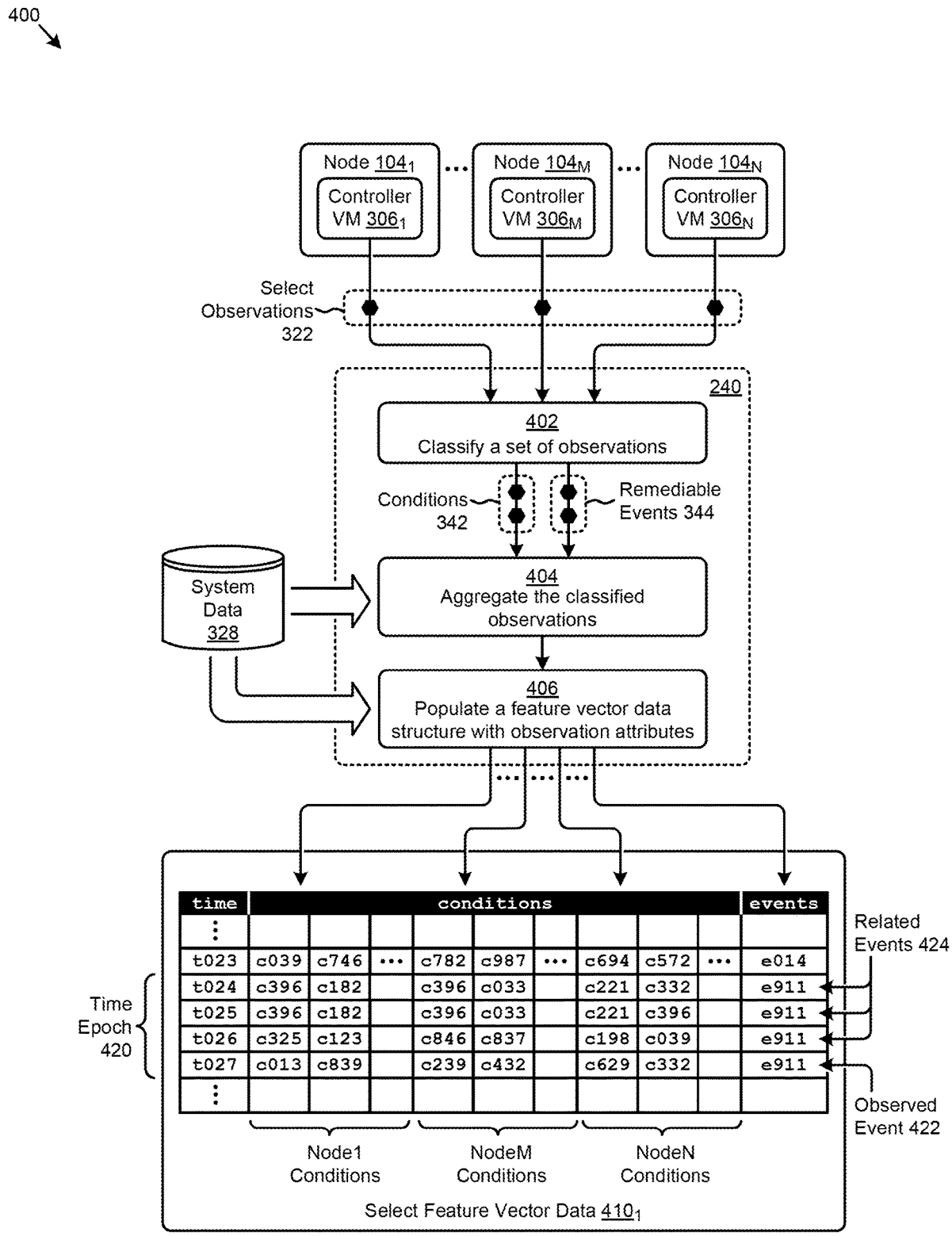
FIG. 4 presents an observation collection technique as implemented in systems that facilitate decentralized fault prediction and remediation in distributed computing environments, according to an embodiment.

FIG. 4 presents an observation collection technique 400 as implemented in systems that facilitate decentralized fault prediction and remediation in distributed computing environments. As an option, one or more variations of observation collection technique 400 or any aspect thereof may be implemented in the context of the architecture and functionality of the embodiments described herein. The observation collection technique 400 or any aspect thereof may be implemented in any environment.

FIG. 4 illustrates aspects pertaining to a decentralized analysis of combined intra-node and inter-node observations independently collected from the nodes of a hyperconverged distributed system to predict impending faults in the system. Specifically, the figure is presented to illustrate one embodiment of certain steps and/or operations for populating feature vectors based at least in part on the observations captured over multiple nodes. As depicted in the figure, the steps and/or operations are associated with step 240 of FIG. 2. A representative scenario is also shown in the figure to illustrate an example application of observation collection technique 400.

Observation collection technique 400 can commence by classifying a set of select observations received from multiple nodes of a computing system (step 402). For example, select observations 322 might be received from the controller VMs (e.g., controller VM $306_1$, . . . , controller VM $306_M$, . . . , controller VM $306_N$) of multiple respective nodes (e.g., node $104_1$, . . . , node $104_M$, . . . , node $104_N$) of a particular hyperconverged distributed system. As can be observed, the observations might be classified into at least a set of conditions 342 and a set of remediable events 344. The classified observations are then aggregated (step 404). In some cases, the observations are aggregated based at least in part on certain system data 328 comprising, for example, virtual-to-physical mapping metadata and/or configuration metadata associated with the system.

A feature vector data structure is then populated with attributes corresponding to the classified and aggregated observations to form various feature vectors (step 406). The data that comprises a feature vector and/or any other data described herein can be organized and/or stored using various techniques. As indicated in a set of select feature vector data $410_1$, feature vector data might be organized and/or stored in a tabular structure (e.g., relational database table) that has rows containing the variables of a particular feature vector. As another example, the feature vector data might be organized and/or stored in a programming code object that has instances corresponding to a particular feature vector and properties corresponding to the variables of the feature vector.

As can be observed in select feature vector data $410_1$, a data record (e.g., table row or object instance) for a particular feature vector might comprise a timestamp (e.g., stored in a "time" field), one or more condition identifiers (e.g., stored in an array of "conditions" fields), one or more remediable event identifiers (e.g., stored in an "events" field), and/or other variables associated with the feature vector. To facilitate efficient storage and/or processing of the feature vectors, merely the unique identifiers (e.g., "c396", "c182", . . . , "e911", etc.) of the conditions and remediable events are stored in the feature vector data structure. Such unique identifiers might be mapped to the underlying observations in a set of observation profiles stored in system data 328.

As further indicated in select feature vector data $410_1$, certain feature vectors comprise conditions from multiple nodes. Specifically, select feature vector data $410_1$ comprises conditions from at least "Node1" (e.g., node $104_1$), "NodeM" (e.g., node $104_M$), and nodeN (e.g., node $104_N$). As such, inter-node effects that might contribute to a particular remediable event occurring or predicted to occur are captured in the feature vectors. Furthermore, to facilitate prediction of remediable events before they occur, such events are associated with conditions that were present prior to an observed remediable event.

For example, an observed event 422 identified by "e911" that occurred at time "t027" is not only recorded in the feature vector corresponding to time "t027" but is also recorded at related events 424 in the feature vectors corresponding to times "t026", "t025", and "t024". As can be observed, a time epoch 420 associated with observed event 422 comprises times "t027", "t026", "t025", and "t024". In this and other embodiments, the time epoch is the amount of time that is predicted to remain before occurrence of a failure or other unwanted remediable event. The time epoch might be defined in terms of absolute time (e.g., minutes or hours), or in terms of number of feature vectors (e.g., 10,000 vectors), or some combination of both. In some cases, the time epoch might be statistically defined and/or dynamically adjusted based on historical observations.

The feature vectors that are populated according to the foregoing techniques and/or other herein disclosed techniques can be analyzed to determine one or more impending remediable events. This is discussed in further detail as follows.

Figure 5A:
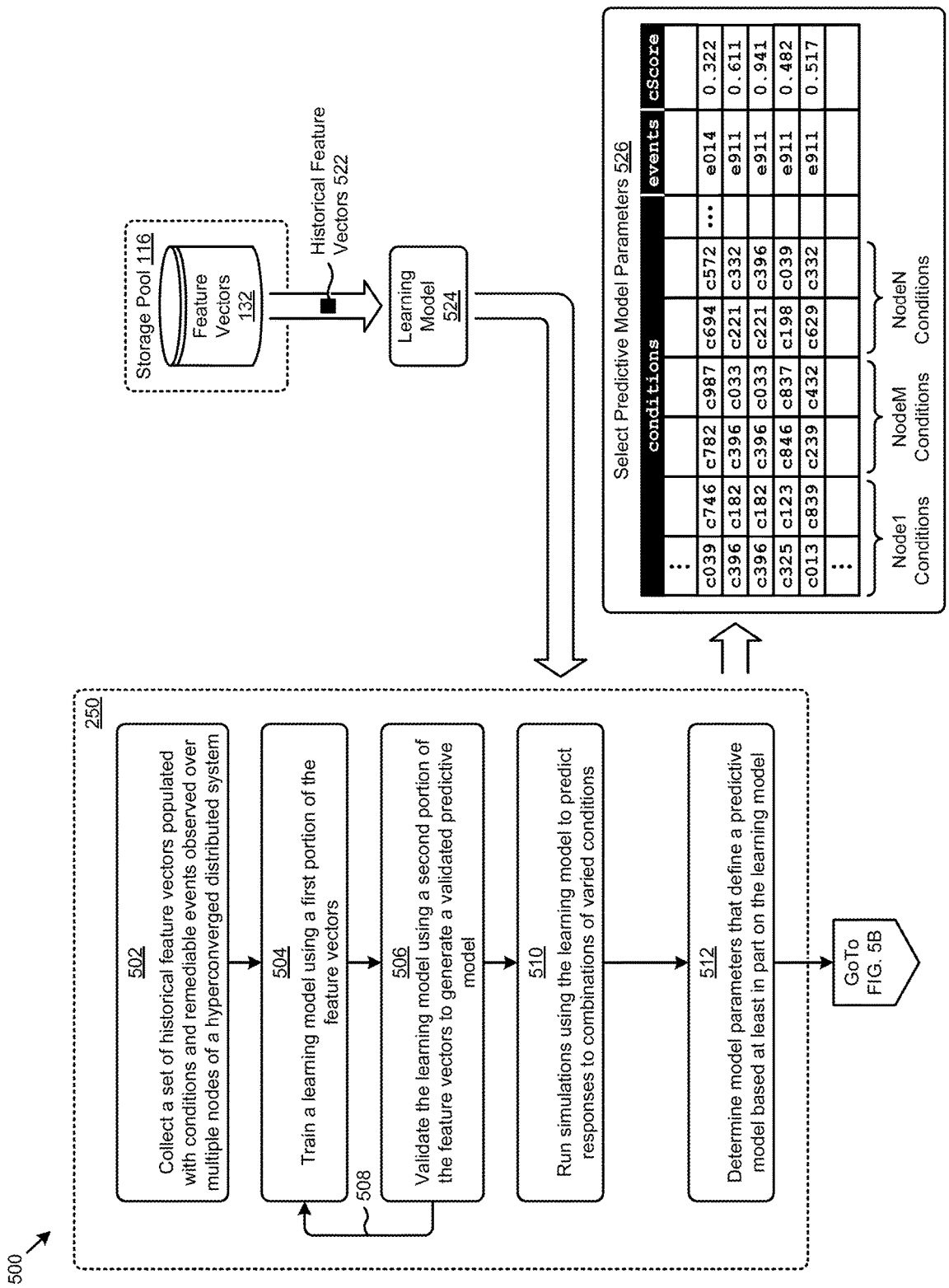
FIG. 5A and FIG. 5B depict a fault prediction technique as implemented in systems that facilitate decentralized fault prediction and remediation in distributed computing environments, according to an embodiment.
Figure 5B:
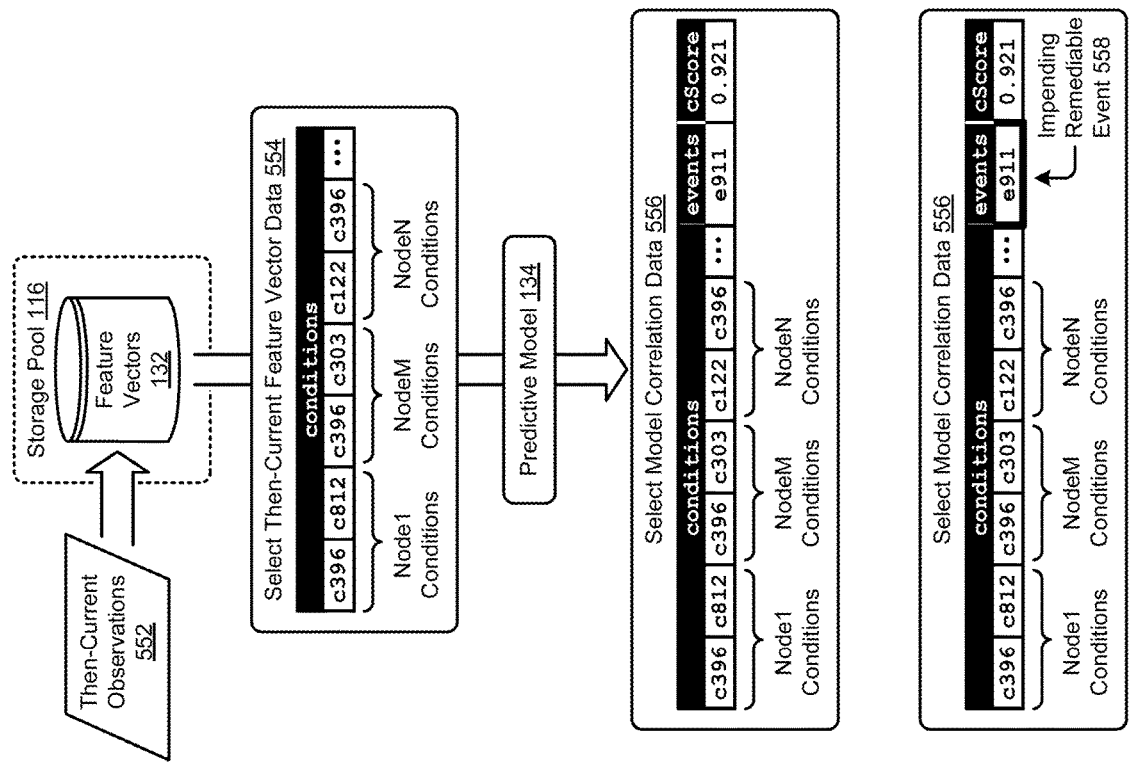
Figure 5B:
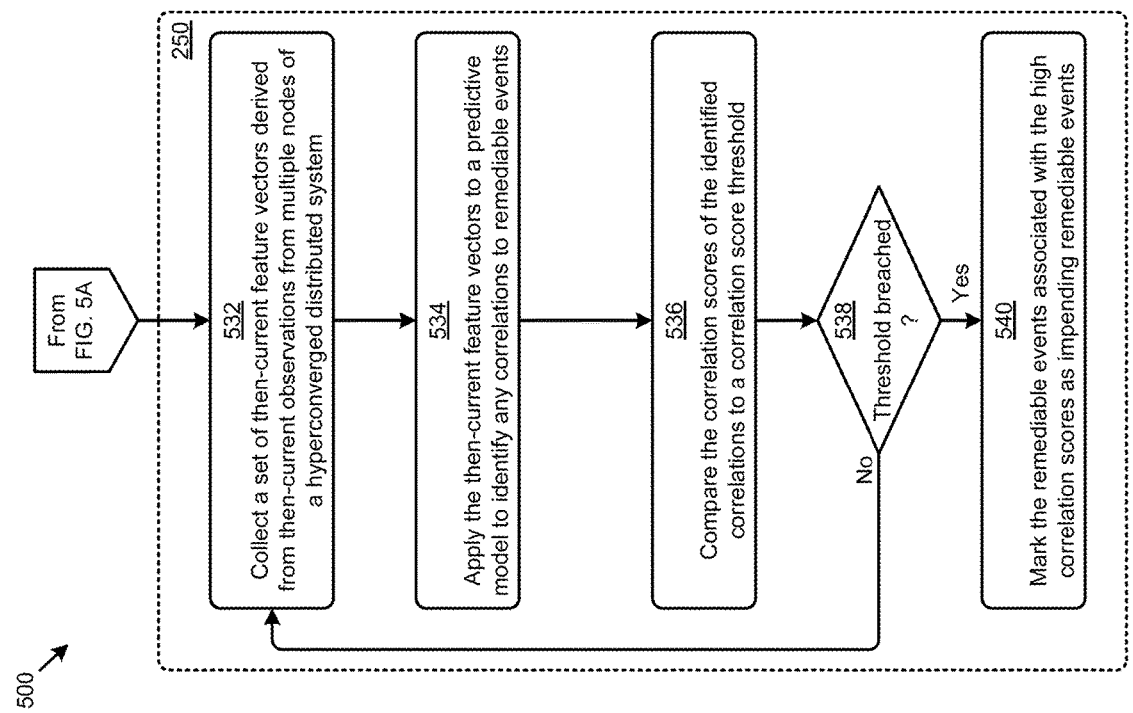

FIG. 5A and FIG. 5B depict a fault prediction technique 500 as implemented in systems that facilitate decentralized fault prediction and remediation in distributed computing environments. As an option, one or more variations of fault prediction technique 500 or any aspect thereof may be implemented in the context of the architecture and functionality of the embodiments described herein. The fault prediction technique 500 or any aspect thereof may be implemented in any environment.

FIG. 5A and FIG. 5B illustrate aspects pertaining to a decentralized analysis of combined intra-node and inter-node observations independently collected from the nodes of a hyperconverged distributed system to predict impending faults in the system. Specifically, the figures are presented to illustrate one embodiment of certain steps and/or operations for accessing historical feature vectors to define a predictive model (e.g., FIG. 5A) and applying features vectors to the predictive model to determine one or more impending remediable events (e.g., FIG. 5B). As depicted in the figures, the steps and/or operations are associated with step 250 of FIG. 2. A representative scenario is also shown in the figures to illustrate an example application of fault prediction technique 500.

Fault prediction technique 500 can commence in FIG. 5A by collecting a set of historical feature vectors populated with conditions and remediable events observed over multiple nodes of a hyperconverged distributed system (step 502). As illustrated, for example, a set of historical feature vectors 522 might be collected from feature vectors 132 in storage pool 116 as earlier described. In certain embodiments, historical feature vectors 522 might be organized in a data structure such as depicted in select feature vector data 4101 of FIG. 4. As such, each of the historical feature vectors 522 comprises a combination of conditions and remediable events (if any) that are associated with a certain timestamp (e.g., moment in time).

A first portion of the historical feature vectors are used to train one or more learning models (step 504). For example, a select set of historical feature vectors 522 might be used to generate a learning model 524. A second (e.g., different) portion of the historical feature vectors are used to validate the learning model (step 506). The processes of training and validating can be iterated (see path 508) until the learning model 524 behaves within target tolerances (e.g., with respect to predictive statistic metrics, descriptive statistics, significance tests, etc.). In some cases, additional historical feature vectors can be collected to further train the learning model.

When a learning model that behaves within target tolerances is established, simulations are run that apply varying combinations of conditions to the learning model so as to generate predicted responses to the varying conditions (step 510). By simulating a certain set of combinations of varied conditions, a predictive model can be defined that serves to capture a broad range of condition variations that might be present in the system. The parameters that define a predictive model are determined based at least in part on the learning model and/or the simulations of the learning model (step 512). As an example, model parameters of predictive model 134 earlier described might be determined according to fault prediction technique 500. As indicated in a representative set of select predictive model parameters 526, the parameters comprise varying sets of conditions and respective correlation scores (e.g., stored in a "cScore" field) that quantify a correlation between the sets of conditions and one or more remediable events. For example, one particular set of conditions that comprises a "c396" condition at each of "Node1", "NodeM", and "NodeM", is highly correlated with remediable event "e911" as indicated by a correlation score of "0.941". In some embodiments, calculation of a correlation score includes consideration of the urgency of remediation. For example, calculation of a correlation score might include a time epoch, where a shorter time epoch might increase the correlation score.

The steps of populating feature vectors according and using them to determine one or more impending remediable events and/or faults is discussed in further detail as follows.

Referring to FIG. 5B, fault prediction technique 500 can include the step of collecting a set of then-current feature vectors derived from certain then-current observations from multiple nodes of a hyperconverged distributed system (step 532). As illustrated, a representative set of select then-current feature vector data 554 from feature vectors 132 in storage pool 116 might be derived from instances of then-current observations 552. The then-current feature vectors are applied to a predictive model to identify any correlations to remediable events (step 534). As shown in select model correlation data 556, applying the conditions of select then-current feature vector data 554 to predictive model 134 resulted in a correlation to remediable event "e911" that is quantified by a correlation score of "0.921".

The correlation scores of the identified correlations are compared to a correlation score threshold (step 536). For example, a correlation score threshold might be set to a value of 0.8 so that correlations having correlation scores greater than 0.8 are considered to exhibit a statistically significant correlation, whereas all other correlations with scores lower than 0.8 are considered to be statistically insignificant. If there are no correlation scores of the identified correlations that breach a correlation score threshold ("No" path of decision 538), no further processing of the present set of then-current feature vectors is performed and a next set of then-current feature vectors are collected for processing (step 532). If one or more correlation scores of the identified correlations (e.g., correlations between conditions, correlations between events, etc.) breach the threshold ("Yes" path of decision 538), then the remediable events associated with the correlation scores that breached the threshold are marked as impending remediable events (step 540). For example, in the case where the correlation score threshold is set to 0.8, the remediable event "e911" in select model correlation data 556 will be marked as an impending remediable event 558.

The foregoing discussions include techniques for presenting various remediation messages in response to predicting such impending remediable events (e.g., step 260 of FIG. 2), which techniques are disclosed in further detail as follows.

Figure 6:
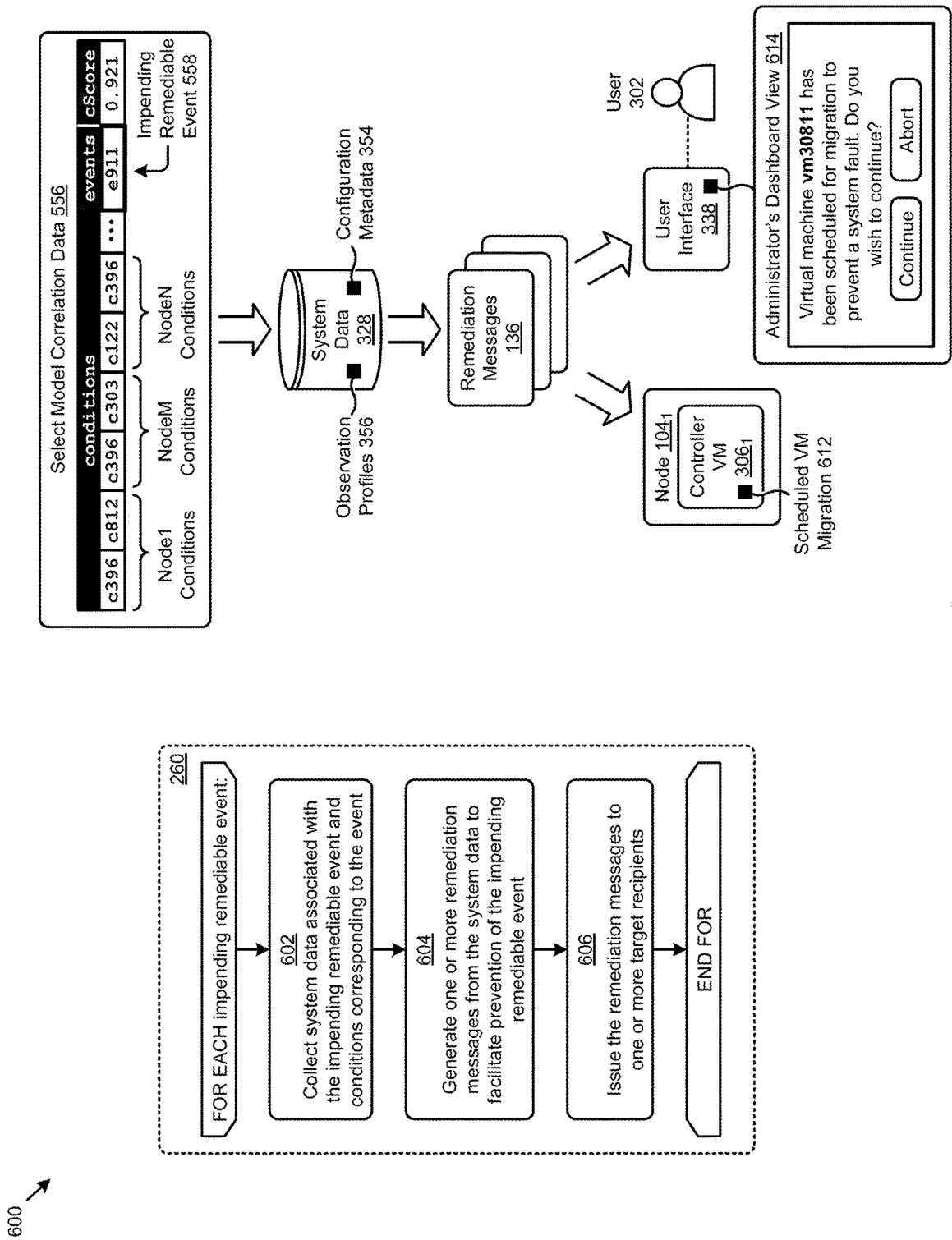
FIG. 6 presents a remediation message generation technique as implemented in systems that facilitate decentralized fault prediction and remediation in distributed computing environments, according to an embodiment.

FIG. 6 presents a remediation message generation technique 600 as implemented in systems that facilitate decentralized fault prediction and remediation in distributed computing environments. As an option, one or more variations of remediation message generation technique 600 or any aspect thereof may be implemented in the context of the architecture and functionality of the embodiments described herein. The remediation message generation technique 600 or any aspect thereof may be implemented in any environment.

FIG. 6 illustrates aspects pertaining to a decentralized analysis of combined intra-node and inter-node observations independently collected from the nodes of a hyperconverged distributed system to predict impending faults in the system. Specifically, the figure is presented to illustrate one embodiment of certain steps and/or operations for presenting remediation messages to facilitate prevention of impending remediable events discovered by the herein disclosed techniques. As depicted in the figure, the steps and/or operations are associated with step 260 of FIG. 2. A representative scenario is also shown in the figure to illustrate an example application of remediation message generation technique 600.

For each impending remediable event identified by the herein disclosed techniques, remediation message generation technique 600 collects system data associated with the impending remediable event and the conditions that correspond to the event (step 602). For example, system data 328 might be accessed to collect information pertaining to impending remediable event 558 and the associated conditions as depicted in select model correlation data 556. More specifically, the event and condition identifiers (e.g., "e911", "c396", "c812", etc.) might be used to query the observation profiles 356 in system data 328 to collect certain attributes (e.g., description, associated entities, metric values, etc.) pertaining to the corresponding event and/or conditions. A set of configuration metadata 354 at system data 328 might also be accessed to gather additional information related to the configuration of the entities (e.g., nodes, VMs, vDisks, etc.) associated with the event and/or conditions.

One or more remediation messages derived at least in part from the system data is generated to facilitate prevention of the impending remediable event (step 604). For example, a set of remediation messages 136 might be generated based at least in part on portions of the system data 328 that correspond to impending remediable event 558 and associated conditions. The remediation messages are then issued to one or more target recipients (step 606). As an example, if impending remediable event 558 corresponds to an impending failure of node $104_1$ due to an overweight VM workload, a first remediation message or set of messages might be issued to controller VM $306_1$ of node $104_1$ to schedule a migration of one or more VMs to another node (e.g., scheduled VM migration 612).

As another example, if, after analyzing the historical data to identify an impending remediable event, that remediable event had occurred historically when data acted upon by a first node was data that was stored at the second node, then the data might be moved from the second node to the first node before the first node acts on the data—thus avoiding a re-occurrence of the impending remediable event. A remediation message might be issued to user interface 338 of user 302 to alert the user that data had been moved so as to avoid a fault. Concurrently, there might be other contemporaneous remediable events, and as such, another remediation message or set of messages might be issued to user interface 338 of user 302 to alert the user of other impending faults. The remediation message might include one or more suggested remediation actions. Specifically, a remediation message that describes a particular remediation action (e.g., to schedule VM migration) might raise a request for the user to provide a confirmation. Furthermore, a request for a confirmation of the suggested remediation action(s) might be presented in an administrator's dashboard view 614 at user interface 338.

Additional Embodiments of the Disclosure

Additional Practical Application Examples

Figure 7A:
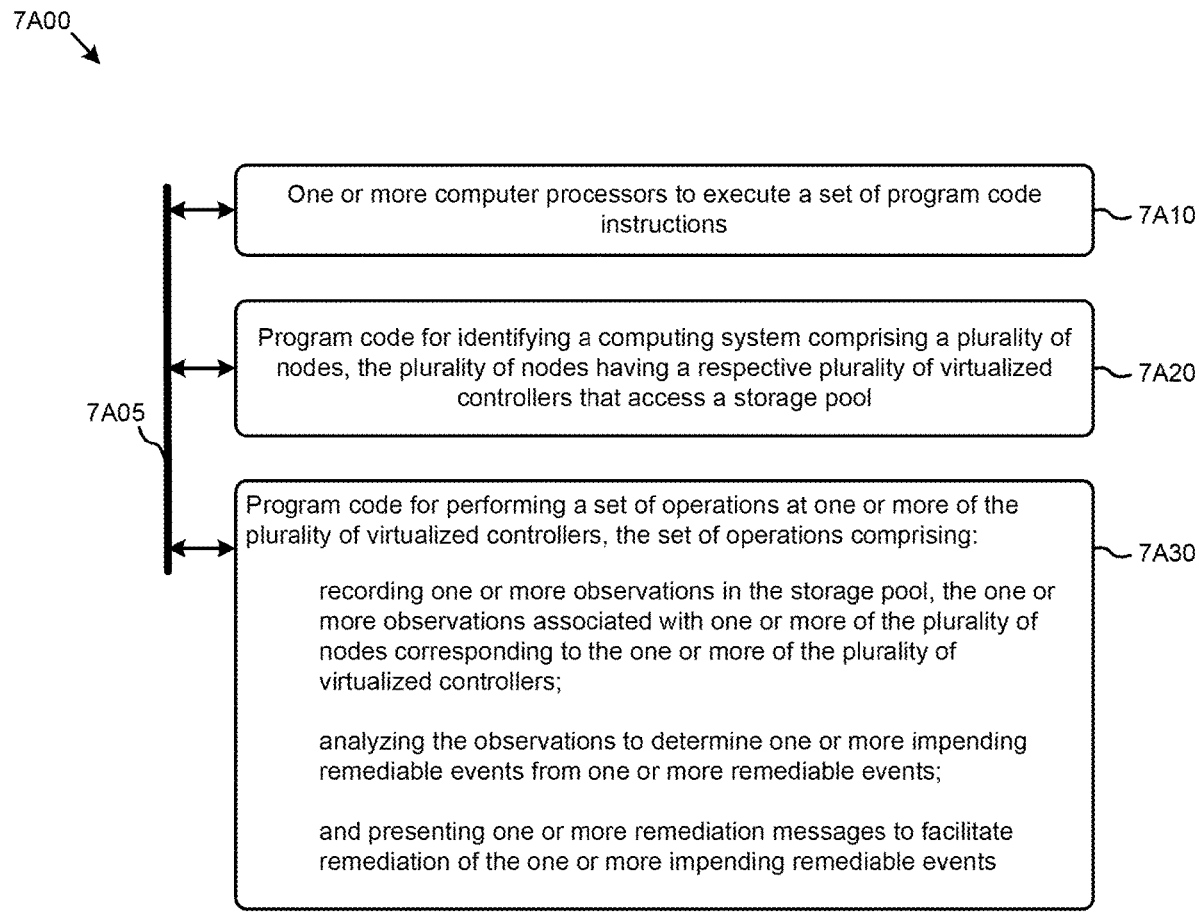
FIG. 7A, FIG. 7B, and FIG. 7C depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that predict impending faults in hyperconverged distributed computing environments. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a computing system comprising a plurality of nodes, the plurality of nodes having a respective plurality of virtualized controllers that access a storage pool (module 7A20); performing a set of operations at one or more of the plurality of virtualized controllers, the set of operations comprising: recording one or more observations in the storage pool, the one or more observations associated with one or more of the plurality of nodes corresponding to the one or more of the plurality of virtualized controllers; analyzing the observations to determine one or more impending remediable events from one or more remediable events; and presenting one or more remediation messages to facilitate remediation of the one or more impending remediable events (module 7A30).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
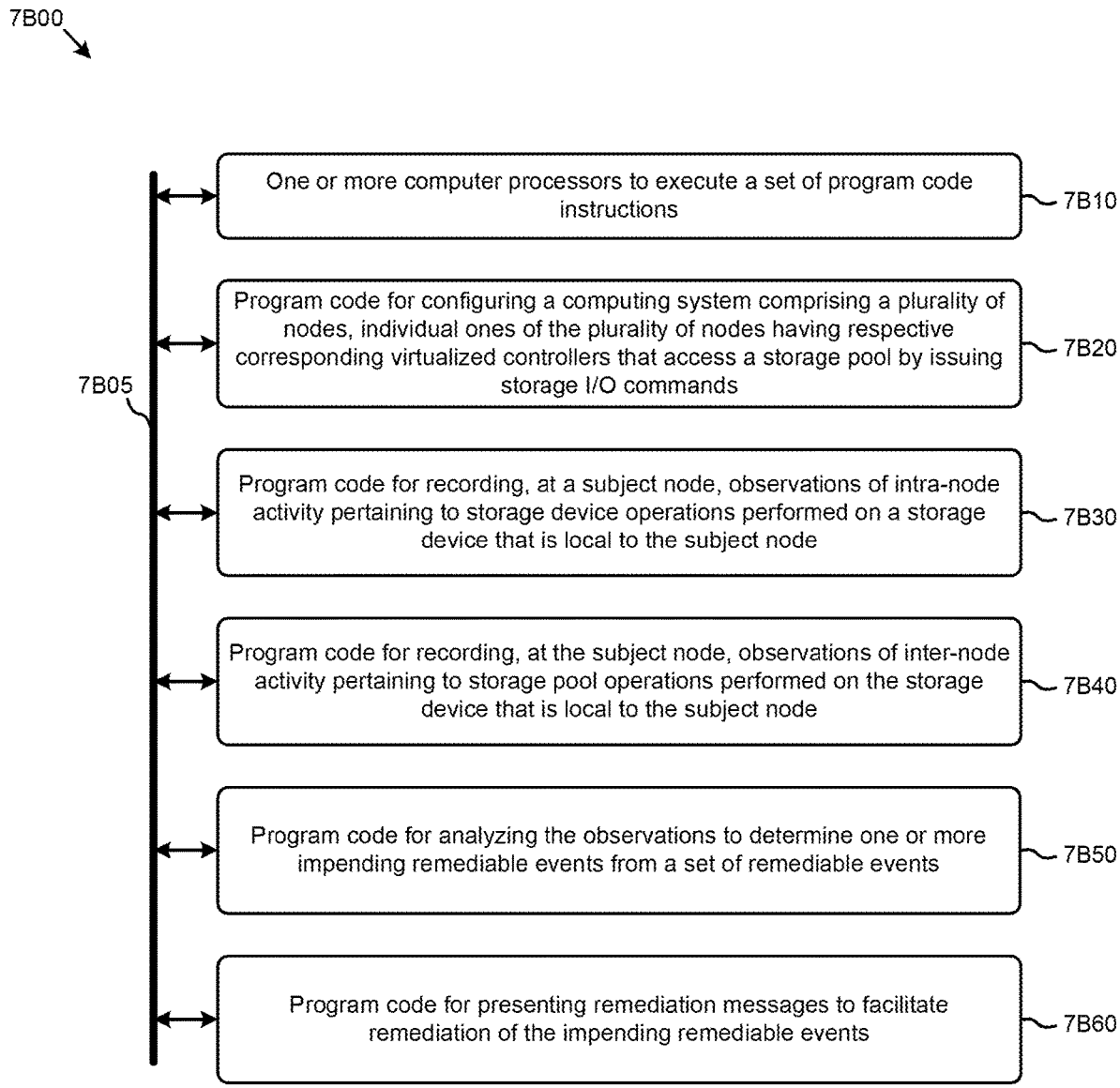

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: configuring a computing system comprising a plurality of nodes, individual ones of the plurality of nodes having respective corresponding virtualized controllers that access a storage pool by issuing storage I/O commands (module 7B20); recording, at a subject node, observations of intra-node activity pertaining to storage device operations performed on a storage device that is local to the subject node (module 7B30); recording, at the subject node, observations of inter-node activity pertaining to storage pool operations performed on the storage device that is local to the subject node (module 7B40); analyzing the observations to determine one or more impending remediable events from a set of remediable events (module 7B50); and presenting remediation messages to facilitate remediation of the impending remediable events (module 7B60).

Figure 7C:
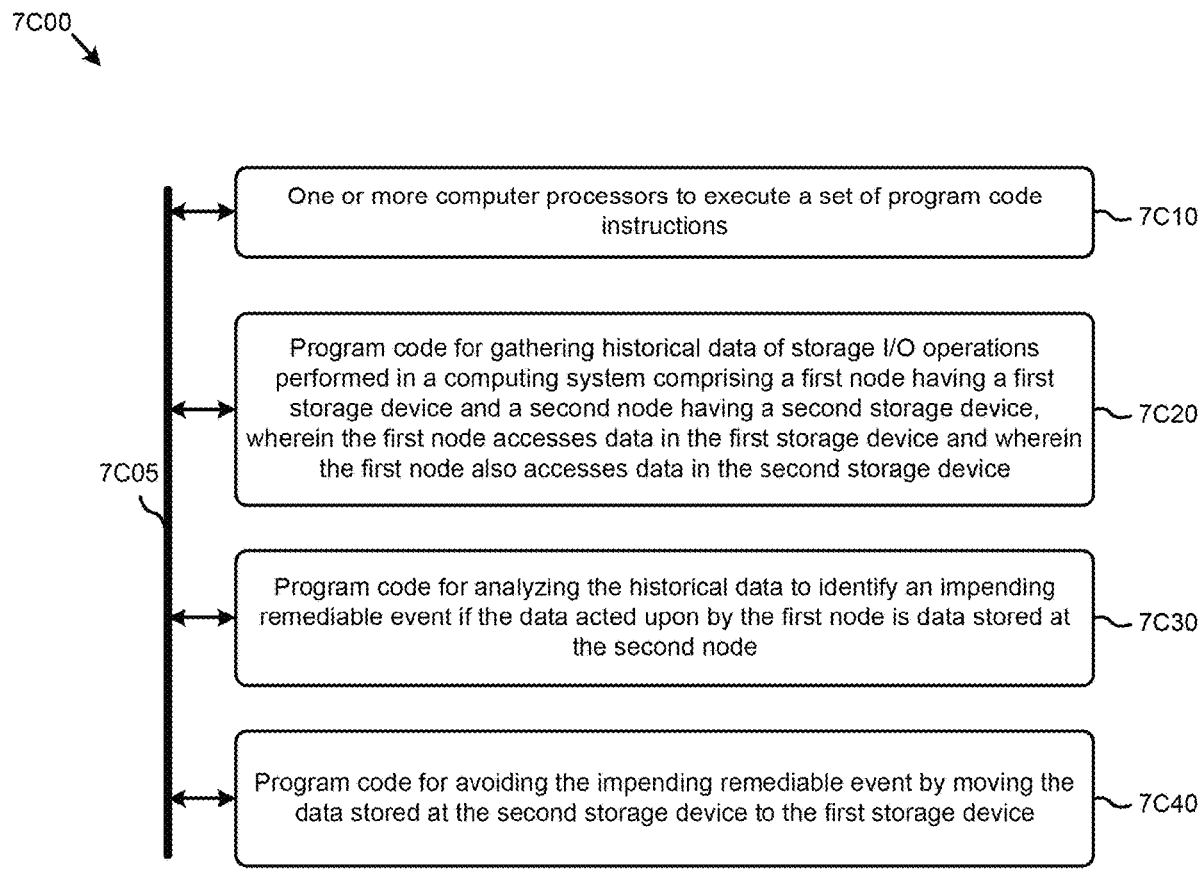

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. As an option, the system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with any other operations over communication path 7C05. The modules of the system can, individually or in combination, perform method operations within system 7C00. Any operations performed within system 7C00 may be performed in any order unless as may be specified in the claims. The shown embodiment implements a portion of a computer system, presented as system 7C00, comprising one or more computer processors to execute a set of program code instructions (module 7C10) and modules for accessing memory to hold program code instructions to perform: gathering historical data of storage I/O operations performed in a computing system comprising a first node having a first storage device and a second node having a second storage device, wherein the first node accesses data in the first storage device and wherein the first node also accesses data in the second storage device (module 7C20); analyzing the historical data to identify an impending remediable event if the data acted upon by the first node is data stored at the second node (module 7C30); and avoiding the impending remediable event by moving the data stored at the second storage device to the first storage device (module 7C40).

System Architecture Overview
Additional System Architecture Examples

Figure 8A:
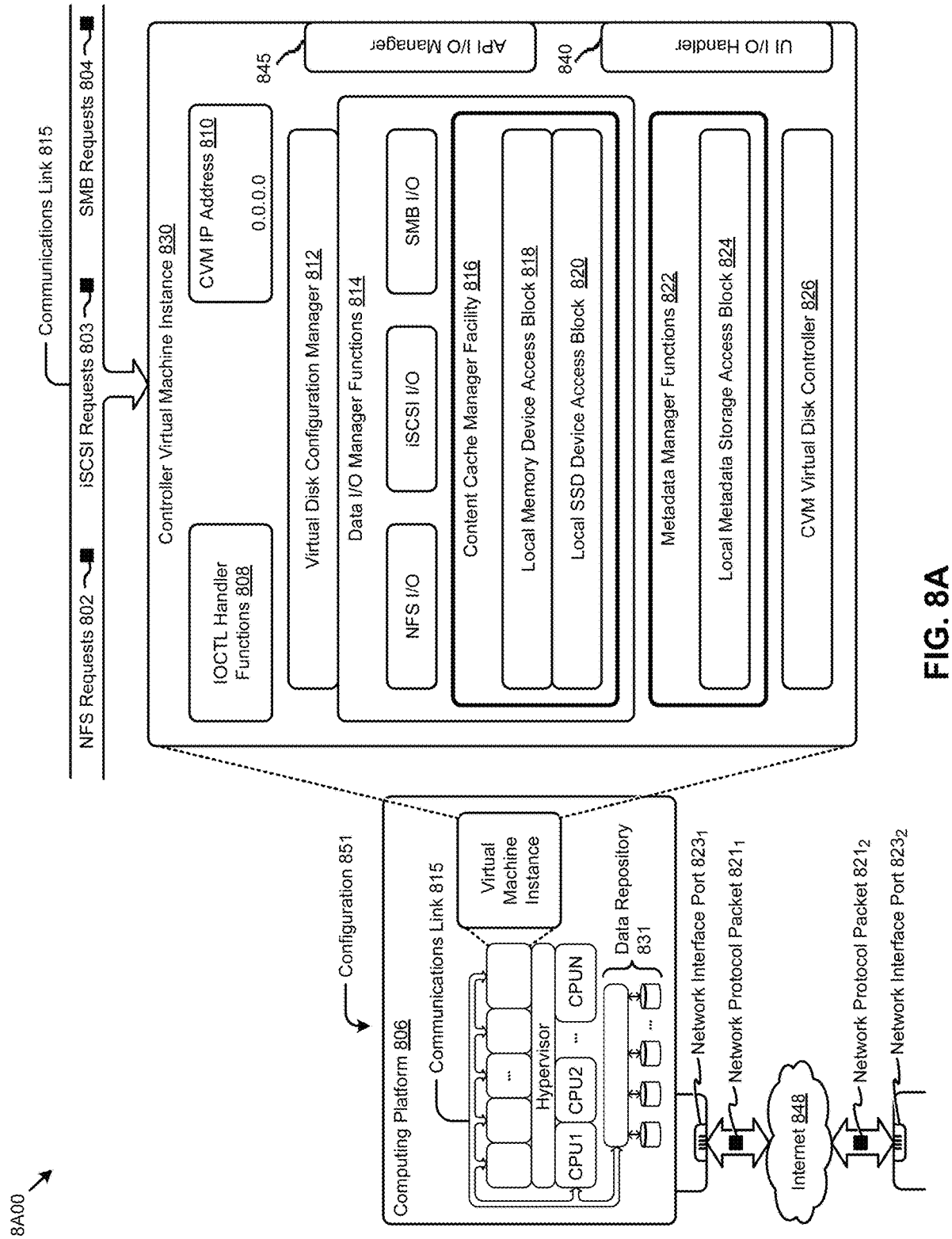
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to decentralized fault prediction and/or remediation in distributed computing environments. In some embodiments, a module may include one or more state machines and/or combinational logic used to implement or facilitate the operational and/or performance characteristics pertaining to decentralized fault prediction and/or remediation in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of decentralized fault prediction and/or remediation in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to decentralized fault prediction and/or remediation in distributed computing environments, and/or for improving the way data is manipulated when performing computerized operations pertaining to a decentralized analysis of combined intra-node and inter-node observations independently collected from the nodes of a hyperconverged distributed system to predict impending faults in the system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
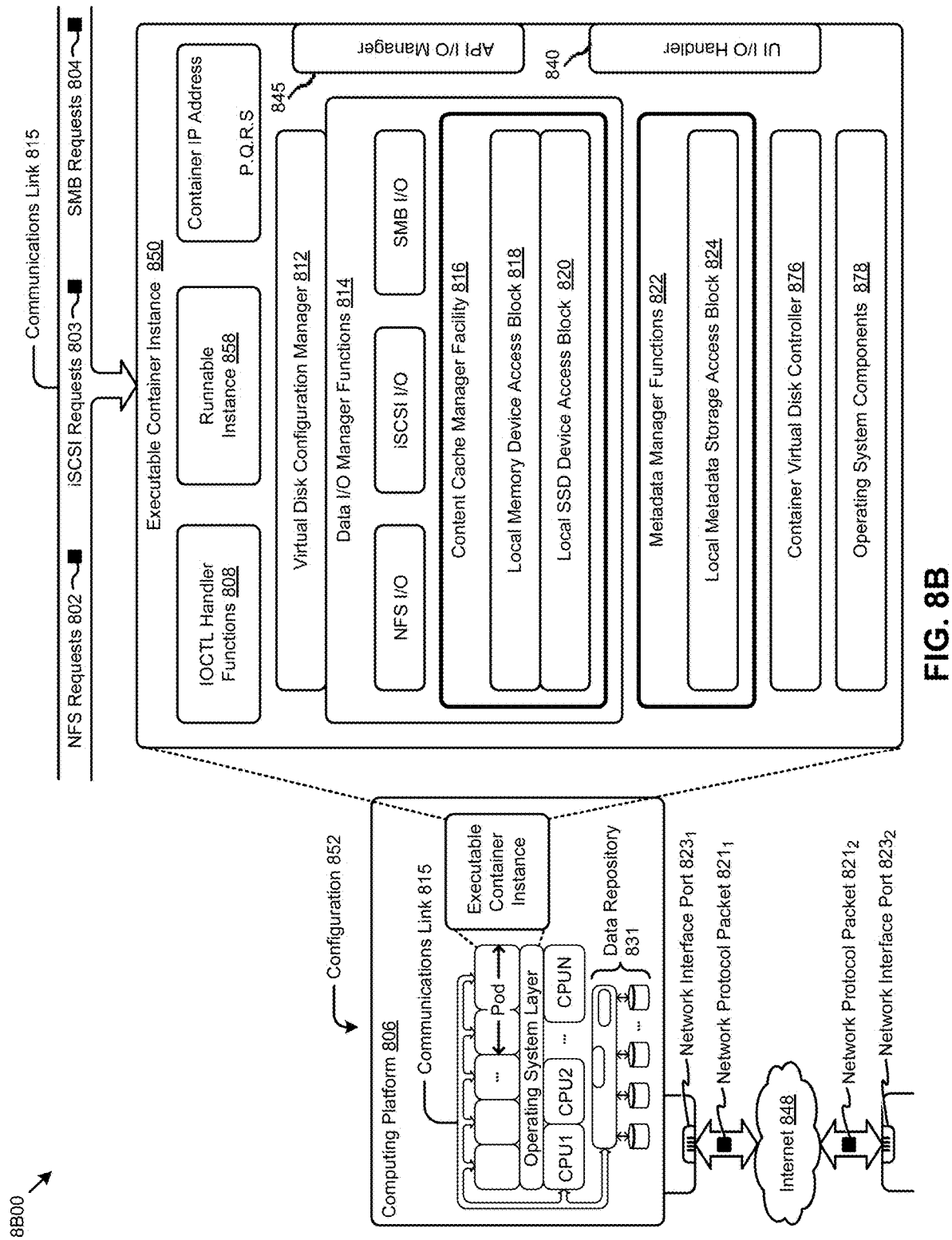

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls–a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
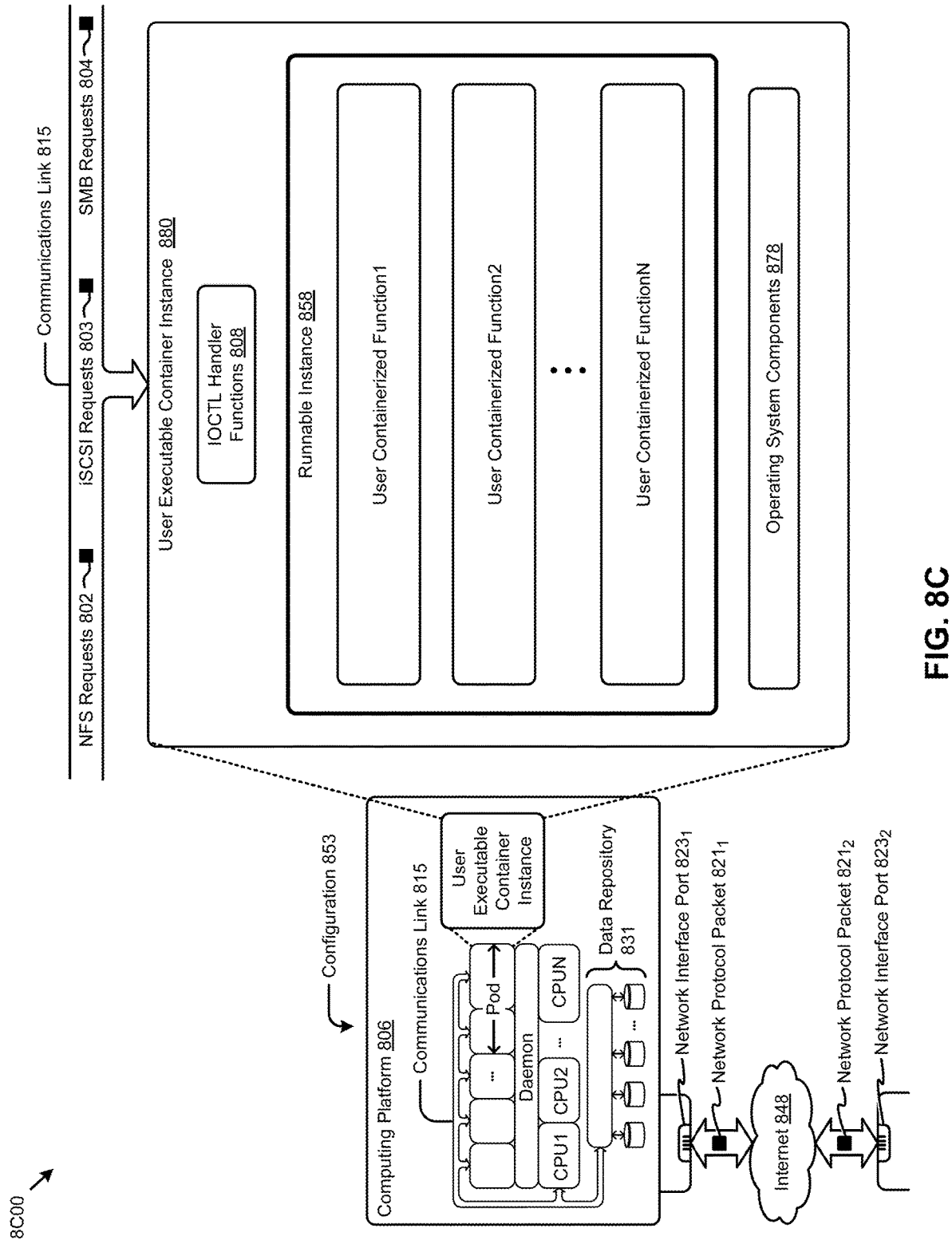

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space. Each of the plurality of storage devices is addressed by addresses that fall within its respective range within the contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   receiving historical data of storage I/O operations performed between nodes in a clustered computing system, the nodes comprising a first node having a first storage device and a second node having a second storage device, wherein the first node accesses data in the second storage device of the second node;
   analyzing the historical data to predict an impending remediable event at the second node; and
   triggering migration of the data accessed by the first node that is stored at the second storage device of the second node to the first storage device of the first node, wherein the migration is triggered based on a prediction of an impending remediable event and previous access to the data by the first node.

2. The method of claim 1, further comprising operations that comprise defining a predictive model based at least in part on a first portion of feature vectors, and wherein the first portion of the feature vectors comprise historical feature vectors.

3. The method of claim 2, wherein the predictive model generates correlation scores, the correlation scores describing correlations between conditions and the impending remediable event.

4. The method of claim 1, wherein the impending remediable event is derived from observations taken from the historical data and further comprising classifying the observations, wherein the observations are classified into at least one condition or into at least one remediable event.

5. The method of claim 1, wherein the impending remediable event is derived from observations taken from the historical data and the observations are aggregated based at least in part on at least one of, a set of configuration metadata, or a set of virtual-to-physical mapping metadata.

6. The method of claim 1, wherein the impending remediable event corresponds to historical operations over first and second storage devices that form a part of a storage pool that spans a plurality of nodes of the clustered computing system.

7. The method of claim 6, wherein an application accesses a common address space that is overlaid over local storage devices of the plurality of nodes, the application uses first and second address ranges within the common address space to access the first storage device and the second storage device respectively, and the historical data is accessed to determine a likelihood of the impending remediable event being raised when the application accesses data of the second storage device, and further comprising remediating the impending remediable event by moving data that is associated with the second address range of the storage pool to a location that corresponds to the first address range of the storage pool.

8. The method of claim 1, further comprising migrating the data accessed by the first node from the second storage device of the second node to the first storage device of the first node.

9. A non-transitory computer readable medium having stored thereon a sequence of instructions which, when executed by a processor causes a set of acts comprising:
receiving historical data of storage I/O operations performed between nodes in a clustered computing system, the nodes comprising a first node having a first storage device and a second node having a second storage device, wherein the first node accesses data in the second storage device of the second node;
analyzing the historical data to predict an impending remediable event at the second node; and
triggering migration of the data accessed by the first node that is stored at the second storage device of the second node to the first storage device of the first node, wherein the migration is triggered based on a prediction of an impending remediable event and previous access to the data by the first node.

10. The non-transitory computer readable medium of claim 9, wherein the set of acts further comprise operations that comprise defining a predictive model based at least in part on a first portion of feature vectors, and wherein the first portion of the feature vectors comprise historical feature vectors.

11. The non-transitory computer readable medium of claim 10, wherein the predictive model generates correlation scores, the correlation scores describing correlations between conditions and the impending remediable event.

12. The non-transitory computer readable medium of claim 9, wherein the impending remediable event is derived from observations taken from the historical data and the set of acts further comprise classifying the observations, wherein the observations are classified into at least one condition or into at least one remediable event.

13. The non-transitory computer readable medium of claim 9, wherein the impending remediable event is derived from observations taken from the historical data and the observations are aggregated based at least in part on at least one of, a set of configuration metadata, or a set of virtual-to-physical mapping metadata.

14. The non-transitory computer readable medium of claim 9, wherein the impending remediable event corresponds to historical operations over first and second storage devices that form a part of a storage pool that spans a plurality of nodes of the clustered computing system.

15. The non-transitory computer readable medium of claim 14, wherein an application accesses a common address space that is overlaid over local storage devices of the plurality of nodes, the application uses first and second address ranges within the common address space to access the first storage device and the second storage device respectively, the historical data is accessed to determine a likelihood of the impending remedial event being raised when the application accesses data of the second storage device, and the set of acts further comprise remediating the impending remedial event by moving data that is associated with the second address range of the storage pool to a location that corresponds to the first address range of the storage pool.

16. The non-transitory computer readable medium of claim 9, wherein the set of acts further comprise migrating the data accessed by the first node from the second storage device of the second node to the first storage device of the first node.

17. A system comprising:
a storage medium having stored thereon a sequence of instructions; and
a processor that executes the sequence of instructions to cause a set of acts comprising,
receiving historical data of storage I/O operations performed between nodes in a clustered computing system, the nodes comprising a first node having a first storage device and a second node having a second storage device, wherein the first node accesses data in the second storage device of the second node;
analyzing the historical data to predict an impending remediable event at the second node; and
triggering migration of the data accessed by the first node that is stored at the second storage device of the second node to the first storage device of the first node, wherein the migration is triggered based on a prediction of an impending remediable event and previous access to the data by the first node.

18. The system of claim 17, wherein the set of acts further comprise operations that comprise defining a predictive model based at least in part of feature vectors, and wherein the first portion of the feature vectors comprise historical feature vectors.

19. The system of claim 18, wherein the predictive model generates correlation scores, the correlation scores describing correlations between conditions and the impending remediable event.

20. The system of claim 17, wherein the impending remediable event is derived from observations taken from the historical data and the set of acts further comprise classifying the observations, wherein the observations are classified into at least one condition or into at least one remediable event.

21. The system of claim 17, wherein the impending remediable event is derived from observations taken from the historical data and the observations are aggregated based at least in part on at least one of, a set of configuration metadata, or a set of virtual-to-physical mapping metadata.

22. The system of claim 17, wherein the impending remediable event corresponds to historical operations over first and second storage devices that form a part of a storage pool that spans a plurality of nodes of the clustered computing system.

23. The system of claim 22, wherein an application accesses a common address space that is overlaid over local storage devices of the plurality of nodes, the application uses first and second address ranges within the common address space to access the first storage device and the second storage device respectively, the historical data is accessed to determine a likelihood of the impending remedial event being raised when the application accesses data of the second storage device, and the set of acts further comprise remediating the impending remedial event by moving data that is associated with the second address range of the storage pool to a location that corresponds to the first address range of the storage pool.

24. The system of claim 17, wherein the set of acts further comprise migrating the data accessed by the first node from the second storage device of the second node to the first storage device of the first node.

* * * * *